(12) United States Patent
Hirano et al.

(10) Patent No.: US 8,761,558 B2
(45) Date of Patent: Jun. 24, 2014

(54) PHOTOELECTRIC TRANSMISSION MODULE

(75) Inventors: Kouki Hirano, Hitachinaka (JP); Juhyun Yu, Mito (JP); Hiroki Yasuda, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 117 days.

(21) Appl. No.: 13/351,702

(22) Filed: Jan. 17, 2012

(65) Prior Publication Data

US 2012/0224814 A1 Sep. 6, 2012

(30) Foreign Application Priority Data

Mar. 2, 2011 (JP) ................................. 2011-045467

(51) Int. Cl.
*G02B 6/30* (2006.01)

(52) U.S. Cl.
USPC .......................................................... 385/49

(58) Field of Classification Search
USPC .......................................................... 385/49
See application file for complete search history.

(56) References Cited

U.S. PATENT DOCUMENTS

| | | | | |
|---|---|---|---|---|
| 7,905,663 B2* | 3/2011 | Yasuda et al. | .................... | 385/88 |
| 8,116,633 B2* | 2/2012 | Yasuda et al. | .................. | 398/139 |
| 2008/0003840 A1* | 1/2008 | Sontage et al. | ................. | 439/55 |
| 2009/0285580 A1* | 11/2009 | Yasuda et al. | ................. | 398/139 |
| 2009/0324171 A1* | 12/2009 | Yasuda et al. | .................... | 385/40 |
| 2010/0061735 A1* | 3/2010 | Minota et al. | ................. | 398/139 |
| 2010/0074581 A1 | 3/2010 | Tanobe et al. | | |
| 2011/0188816 A1* | 8/2011 | Uemura et al. | ................. | 385/88 |
| 2011/0274389 A1 | 11/2011 | Kuroda et al. | | |
| 2013/0064499 A1* | 3/2013 | Satoh et al. | ..................... | 385/14 |

FOREIGN PATENT DOCUMENTS

| | | |
|---|---|---|
| JP | 2010-237640 A | 10/2010 |
| JP | 2010-266669 | 11/2010 |
| WO | 2008/096716 | 8/2008 |
| WO | 2010/058476 | 5/2010 |

OTHER PUBLICATIONS

Office Action 2011-045467 and English Translation thereof dated Nov. 28, 2013.

* cited by examiner

*Primary Examiner* — Sung Pak
(74) *Attorney, Agent, or Firm* — Roberts Mlotkowski Safran & Cole P.C.

(57) ABSTRACT

A photoelectric transmission module being connected to a terminal of a composite cable including an optical fiber and an electrical cable, includes a substrate connected to the electrical cable drawn from the composite cable, a flexible printed circuit board including one end connected to a connector on the substrate and an other end connected to the optical fiber drawn from the composite cable, and an optical waveguide member formed along an outer surface of the flexible printed circuit board and connected to the optical fiber. The flexible printed circuit board further includes a displacement permitting area formed in a section from a connection end of the connector to a connection end of the optical fiber to allow the connection end of the connector and the connection end of the optical fiber to be relatively displaced in a direction along the substrate.

12 Claims, 16 Drawing Sheets

PHOTOELECTRIC TRANSMISSION MODULE

The present application is based on Japanese Patent Application No. 2011-045467 filed on Mar. 2, 2011, the entire contents of which are incorporated herein by reference.

BACKGROUND OF THE INVENTION

1. Field of the Invention

The invention relates to a photoelectric transmission module.

2. Description of the Related Art

In recent years, a photoelectric composite interface for transmitting data using a composite wire in which an optical fiber and an electrical wire (a metal wire, e.g. a copper wire) are contained in one jacketed cable has become widely used. Such a photoelectric composite interface is suitable for transmitting a high definition video signal or audio signal between, e.g., a computer main body and a display or between a digital AV (audio-visual) equipment and a television set.

A photoelectric transmission module, which has electronic components such as a photonic device or an IC (integrated circuit), etc., is mounted in a composite cable connector compatible with the photoelectric composite interface. In the connector, a front end of the optical fiber is connected and fixed to a predetermined position of the photoelectric transmission module in a state of being optically coupled to the photonic device (e.g., JP-A-2010-237640).

SUMMARY OF THE INVENTION

The curvature of the cable containing the optical cable or a difference in expansion and contraction in accordance with temperature variation between the optical fiber and the cable coating causes protrusion of the optical fiber from inner to outer side of the cable or retraction of the optical fiber from the outer side into the inner side of the cable. Especially in case of the composite cable containing an electrical wire and an optical fiber, it is difficult to design to match a linear expansion coefficient of the optical fiber with that of the wire and that of the cable coating, and the linear expansion coefficient of the optical fiber mismatches with those of surrounding members, hence, protrusion and retraction of the optical fiber due to temperature variation are likely to occur.

When the protrusion and retraction of the optical fiber occur in a structure in which a front end of the optical fiber is connected and fixed to a predetermined position in the connector disclosed by JP-A-2010-237640, a problem arises in which the optical fiber is damaged by tension applied thereto.

Accordingly, it is an object of the invention to provide a technique for preventing damage to an optical fiber caused by protrusion and retraction thereof.

(1) According to one embodiment of the invention, a photoelectric transmission module for transmitting optical and electrical signals while being connected to a terminal of a composite cable comprising an optical fiber and an electrical cable comprises:

a substrate connected to the electrical cable drawn from the composite cable;

a flexible printed circuit board comprising one end connected to a connector on the substrate and an other end connected to the optical fiber drawn from the composite cable; and an optical waveguide member formed along an outer surface of the flexible printed circuit board and connected to the optical fiber to transmit an optical signal, wherein the flexible printed circuit board further comprises a displacement permitting area formed in a section from a connection end of the connector to a connection end of the optical fiber to allow the connection end of the connector and the connection end of the optical fiber to be relatively displaced in a direction along the substrate.

In the above embodiment (1) of the invention, the following modifications and changes can be made.

(i) The displacement permitting area is formed by folding over the section of the flexible printed circuit board from the connection end of the connector to the connection end of the optical fiber along the substrate.

(ii) The photoelectric transmission module further comprises:

a photoelectric conversion element on an outer surface of the flexible printed circuit board opposite the outer surface with the optical waveguide member formed thereon to bilaterally convert the optical signal transmitted from the optical fiber via the optical waveguide member and an electrical signal transmitted from the connector; and an IC chip electrically connected to the photoelectric conversion element on the outer surface of the flexible printed circuit board opposite the outer surface with the optical waveguide member formed thereon, wherein the displacement permitting area is formed in an optical signal transmission section for transmitting an optical signal from an arrangement position of the photoelectric conversion element to the connection end of the optical fiber.

(iii) The photoelectric transmission module further comprises:

a photoelectric conversion element on an outer surface of the flexible printed circuit board opposite the outer surface with the optical waveguide member formed thereon to bilaterally convert the optical signal transmitted from the optical fiber via the optical waveguide member and an electrical signal transmitted from the connector; and an IC chip electrically connected to the photoelectric conversion element on the outer surface of the flexible printed circuit board opposite the outer surface with the optical waveguide member formed thereon, wherein the displacement permitting area is formed in an electrical signal transmission section for transmitting an electrical signal from the connection end of the connector to the arrangement position of the photoelectric conversion element.

(iv) While the connection end of the connector is disposed at one end of the substrate, a section of the flexible printed circuit board from the connection end of the connector to the connection end of the optical fiber is once extended toward an other end of the substrate and is then folded back toward the one end of the substrate by turning back at the other end of the substrate, such that both the connection end of the connector and the connection end of the optical fiber are located on the one side of the substrate.

(2) According to another embodiment of the invention, a photoelectric transmission module for transmitting optical and electrical signals while being connected to a terminal of a composite cable comprising an optical fiber and an electrical cable comprises:

a substrate connected to the electrical cable drawn from the composite cable;

a flexible printed circuit board comprising one end connected to a connector provided on the substrate and an other end connected to the optical fiber drawn from the composite cable; and an optical waveguide member formed along an outer surface of the flexible printed circuit board and connected to the optical fiber to transmit an optical signal, wherein the flexible printed circuit board further comprises a displacement permitting area formed in a section from a connection end of the connector to a connection end of the optical fiber and extending in a direction crossing a longitudinal direction of the optical fiber at least partially drawn from the composite cable to allow the connection end of the connector and the connection end of the optical fiber to be relatively displaced in a direction along the substrate with deformation of the displacement permitting area.

In the above embodiment (2) of the invention, the following modifications and changes can be made.

(v) The photoelectric transmission module further comprises:

a photoelectric conversion element on an outer surface of the flexible printed circuit board opposite the outer surface with the optical waveguide member formed thereon to bilaterally convert the optical signal transmitted from the optical fiber via the optical waveguide member and an electrical signal transmitted from the connector; and an IC chip electrically connected to the photoelectric conversion element on the outer surface of the flexible printed circuit board opposite the outer surface with the optical waveguide member formed thereon, wherein, in the displacement permitting area, the connection end of the optical fiber is displaced relative to the connection end of the connector by tensile force of the optical fiber.

(vi) The section of the flexible printed circuit board from the connection end of the connector to the connection end of the optical fiber extends in a direction crossing a longitudinal direction of the substrate that is defined along the longitudinal direction of the optical fiber, and wherein the optical fiber is connected to a side rim at a front end portion in the crossing direction.

(vii) The flexible printed circuit board further comprises a first region extending from the connection end of the connector in the longitudinal direction of the substrate defined along the longitudinal direction of the optical fiber, and a second region formed by bending and extending in a direction crossing the longitudinal direction of the substrate from an end of the first region opposite the connection end of the connector, and wherein the optical fiber is connected to a side rim of the second region at the front end portion in the crossing direction.

(viii) The flexible printed circuit board further comprises a first region extending from the connection end of the connector in the longitudinal direction of the substrate defined along the longitudinal direction of the optical fiber, a second region formed by bending and extending in a direction crossing the longitudinal direction of the substrate from an end of the first region opposite the connection end of the connector, and a third region formed by bending and extending in a longitudinal direction of the substrate from an end of the second region opposite the first region, and wherein the optical fiber is connected to a front end of the third region in the longitudinal direction of the substrate.

(ix) The outer surface of the flexible printed circuit board on a side of the substrate in a thickness direction of the flexible printed circuit board is fixed to the substrate at least within an area from the connection end of the connector to a position closer to the connection end of the optical fiber beyond a position of the photoelectric conversion element, and the displacement permitting area is formed in an optical signal transmission section for transmitting an optical signal from the position of the photoelectric conversion element to the connection end of the optical fiber.

(3) According to another embodiment of the invention, a photoelectric transmission module for transmitting optical and electrical signals while being connected to a terminal of a composite cable comprising an optical fiber and an electrical cable comprises:

a substrate connected to the electrical cable drawn from the composite cable;

a flexible printed circuit board comprising one end connected to a connector on the substrate and an other end connected to the optical fiber drawn from the composite cable;

an optical waveguide member formed along an outer surface of the flexible printed circuit board and connected to the optical fiber to transmit an optical signal;

a photoelectric conversion element on an outer surface of the flexible printed circuit board opposite the outer surface with the optical waveguide member formed thereon to bilaterally convert the optical signal transmitted from the optical fiber via the optical waveguide member and an electrical signal transmitted from the connector;

an IC chip electrically connected to the photoelectric conversion element on the outer surface of flexible printed circuit board opposite the outer surface with the optical waveguide member formed thereon;

a reinforcement plate on an outer surface of the flexible printed circuit board to absorb heat released from the photoelectric conversion element and the IC chip and to prevent deflection of the flexible printed circuit board from occurring therebetween; and a heat dissipating member having at least two contact surfaces, one contact surface being in contact with the reinforcement plate and an other contact surface being in contact with an external member to release the heat absorbed by the reinforcement plate to the external member as a contact object.

In the above embodiment (3) of the invention, the following modifications and changes can be made.

(x) The flexible printed circuit board further comprises a displacement permitting area formed in a section from the connection end of the connector to the connection end of the optical fiber to allow the connection end of the connector and the connection end of the optical fiber to be relatively displaced in a direction along the substrate with deformation of the displacement permitting area, and wherein the heat dissipating member is movable, together with the displacement permitting area, in a direction along the substrate, and a length of the heat dissipating member from the one contact surface in contact with the reinforcement plate to the other contact surface in contact with the external member is set according to at least a movable distance of the reinforcement plate.

Points of the Invention

According to one embodiment of the invention, a photoelectric transmission module is constructed such that a folded-over region (or a displacement permitting area) is provided in the electrical signal transmission section of a flexible printed circuit board, whereby the flexible printed circuit board allows the connection end with an FPC (flexible printed circuit board) connector and the connection end with the optical fiber to be relatively displaced with deformation of the folded-over region. Thus, when tension is applied to the optical fiber, the flexible printed circuit board is pulled in the tension direction from the connection end of the optical fiber.

The connection end of the optical fiber can be displaced in a contraction direction thereof since the electrical signal transmission section has an enough long overall length, and it is thereby possible to compensate the contracted length (or tension) of the optical fiber.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiments of the invention will be described below in reference to the drawings. A photoelectric transmission module of the invention is mounted in a connector for mixed transmission of an optical signal and an electrical signal in order to transmit and receive a control signal while transmitting and receiving large capacity of data between a digital AV equipment and a display, as is, e.g., HDMI (high-definition multimedia interface, registered trademark) connector.

First Embodiment

Figure 1:
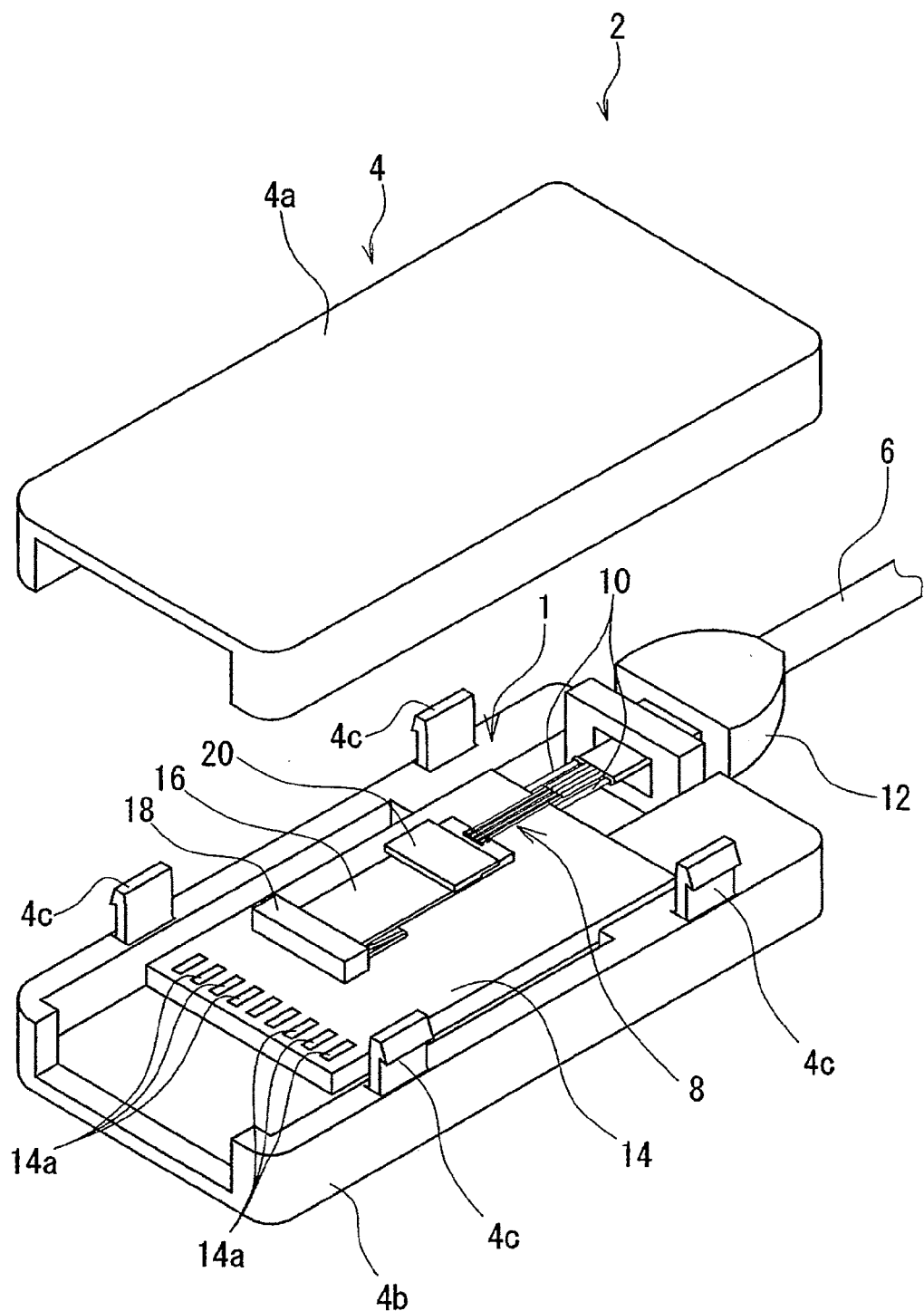
FIG. 1 is a schematic exploded perspective view showing an example of mounting a photoelectric transmission module.
Figure 2:
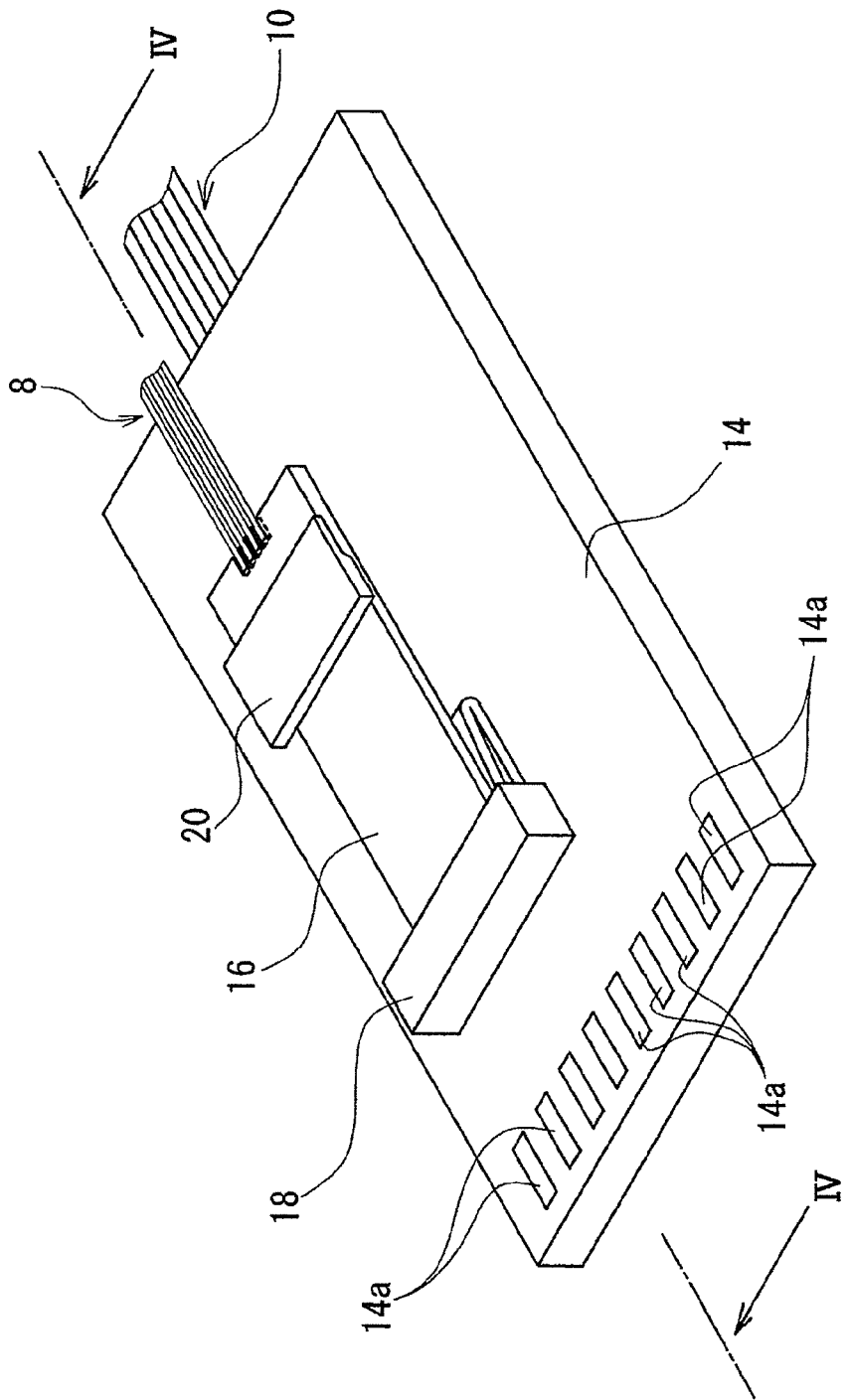
FIG. 2 is an enlarged perspective view showing the photoelectric transmission module in FIG. 1.

FIG. 1 is a schematic exploded perspective view showing a configuration example of a photoelectric transmission module 1. An example in which the photoelectric transmission module 1 is mounted in a housing 4 of a connector 2 is shown here. In addition, FIG. 2 is an enlarged perspective view showing the photoelectric transmission module 1 in FIG. 1.

The connector 2 shown in FIG. 1 complies with, e.g., DVI (digital visual interface) standard or HDMI (registered trademark) standard, etc., and is used for connection between an AV equipment provided with an interface compatible with these standards and a display. Note that, two connectors 2 are provided at each end of a photoelectric composite cable 6 and one of the connectors 2 is shown in FIG. 1.

The connector 2 is provided with the housing 4, and one end of the photoelectric composite cable 6 is drawn in the housing 4 through a sealing member 12. An optical fiber 8 and an electrical wire (a metal wire, e.g. a copper wire) 10 are contained in the photoelectric composite cable 6, and are separated from each other inside the housing 4 so as to be respectively pulled out of the coating. The sealing member 12 fixes a root portion of the photoelectric composite cable 6 and reduces the impact when the photoelectric composite cable 6 is pulled toward outside of the housing 4 or is bent.

The housing 4 is in a hollow box shape as a whole, and is composed of two cases 4a and 4b in this example which are separable from each other. Claw 4c are provided at four corners of the case 4b, and the two cases 4a and 4b are combined into one by snapping the claws 4c into recessed portions (not shown) provided on the case 4a.

The photoelectric transmission module 1 is placed in the housing 4 and the photoelectric composite cable 6 is connected to the photoelectric transmission module 1. The photoelectric transmission module 1 is provided with a substrate 14 which is attached to, e.g., the case 4b.

The substrate 14 is a hard substrate made of, e.g., a glass epoxy resin, and a conductor pattern (not shown in FIG. 1) formed of, e.g., copper foil, etc., is formed on an outer surface of the substrate 14. In addition, plural electrodes 14a as a conductor pattern are formed in a widthwise row at one longitudinal end of the substrate 14, and are to be connected to a non-illustrated connector terminal. For example, the connector terminal partially protrudes from the housing 4 and the protruding portion is inserted into a receptacle of an external device.

In addition, a flexible printed circuit board 16 is placed on the outer surface of the substrate 14 facing the case 4a (an upper surface in FIG. 1). To the flexible printed circuit board 16, the optical fiber 8 is connected at one longitudinal end and a FPC connector 18 is connected at another end. The FPC connector 18 is mounted on the substrate 14, and an electrode of the FPC connector 18 and an electrode pattern of the flexible printed circuit board 16 (none of them are shown in the drawings) are crimped to each other.

The flexible printed circuit board 16 is formed of, e.g., a polyimide film having flexibility and translucency, and a conductor pattern (not shown) formed of copper foil, etc., is formed on upper and lower outer surface of the film. In addition, a photoelectric conversion element and an IC (integrated circuit) chip (none of them are shown in FIG. 1) are arranged on an outer surface of the flexible printed circuit board 16 facing the substrate 14 (a lower surface in FIGS. 1 and 2). The photoelectric conversion element and the IC chip are, e.g., flip-chip-mounted on the outer surface of the flexible printed circuit board 16.

In addition, a reinforcement plate 20 is placed on an outer surface of the flexible printed circuit board 16 facing the case 4a (the upper surface in FIGS. 1 and 2). The reinforcement plate 20 is provided at a position opposite to the photoelectric conversion element and the IC chip with the flexible printed circuit board 16 interposed therebetween. At this position, the reinforcement plate 20 absorbs heat released from the photoelectric conversion element or the IC chip and reinforces the periphery of the region in which these components are mounted.

The overall length of the flexible printed circuit board 16 in a direction along the substrate 14 is greatly longer than a distance between a connection end of the FPC connector 18 and a connection end of the optical fiber 8. In detail, a length between both longitudinal ends of the flexible printed circuit board 16 (overall length) is set to, e.g., more than 1.0 to about 3.0 times the length, when viewed in a direction along the substrate 14, of the distance between the connection end of the FPC connector 18 and the connection end of the optical fiber 8. By using the excess length (an extra length), the flexible printed circuit board 16 is arranged so as to be folded over in a Z-shape from a location of the reinforcement plate 20 to a portion close to the connection end of the FPC connector 18. The folded-over shape of the flexible printed circuit board 16 will be described later using still another drawing.

Figure 3:
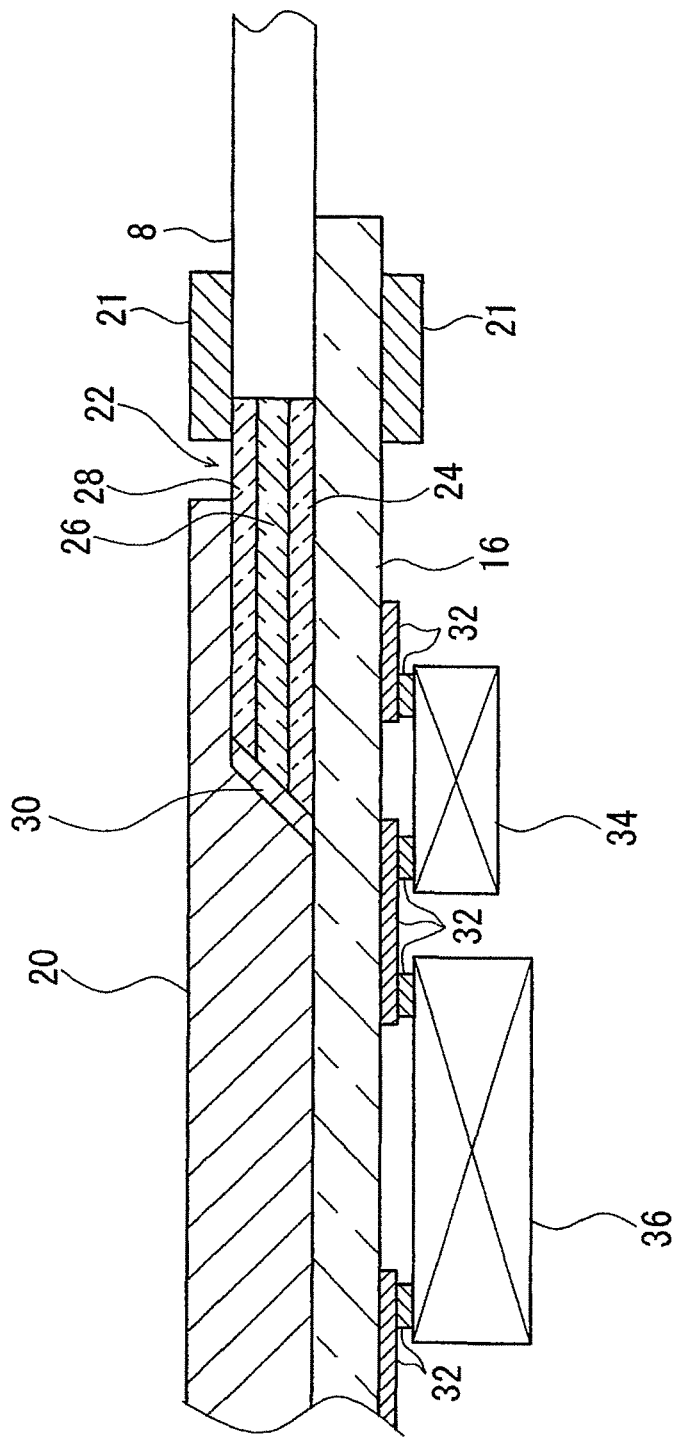
FIG. 3 is a vertical cross sectional view along a longitudinal direction of a flexible printed circuit board.

FIG. 3 is a vertical cross sectional view along a longitudinal direction of the flexible printed circuit board 16. Note that, only a structure of a portion close to the connection end of the optical fiber 8 is shown in the cross section of FIG. 3, especially for the flexible printed circuit board 16.

The reinforcement plate 20 and a polymer waveguide 22 as an optical waveguide member are provided on a mounting surface of the flexible printed circuit board 16 (an upper surface in FIG. 3). The reinforcement plate 20 is mounted on the flexible printed circuit board 16 so as to cover a portion of the polymer waveguide 22, and accordingly, a portion of the reinforcement plate 20 is processed.

The polymer waveguide 22 is composed of an under cladding layer 24, a core 26 and an over cladding layer 28. As a material of the polymer waveguide 22, it is possible to use, e.g., an epoxy resin and a polyimide resin, etc.

The under cladding layer 24 is arranged on the mounting surface of the flexible printed circuit board 16, and the core 26 is laminated on the under cladding layer 24. Then, the over cladding layer 28 is laminated on the core 26.

The optical fiber 8 is connected to one end of the polymer waveguide 22. The core 26 is arranged along an optical axis of the optical fiber 8, and light output from the optical fiber 8 is guided to the core 26. Meanwhile, a pair of plates 21 is arranged at opposite positions on upper and lower surfaces, when viewed in a thickness direction, of the flexible printed circuit board 16 and on a front end portion of the optical fiber 8 even though it is not shown in FIGS. 1 and 2, and the plates 21 are firmly fixed on the upper and lower surfaces by an adhesive. In addition, the plate 21 which is arranged on the upper surface covers the front end portion of the optical fiber 8 and the polymer waveguide 22 connected thereto, and the front end portion of the optical fiber 8 is sandwiched and held by the pair of plates 21.

Meanwhile, another end of the polymer waveguide 22 is shaped into an inclined surface of 45 degrees with respect to the optical axis, and a mirror surface 30 is provided so as to be in contact with the surface of the other end. The mirror surface 30 is also inclined at 45 degrees with respect to the optical axis.

On a surface of the flexible printed circuit board 16 opposite to the mounting surface (a lower surface in FIG. 3), a photoelectric conversion element 34 and an IC chip 36 are mounted using a conductor pattern 32. The photoelectric conversion element 34 is a light-emitting element such as LD (laser diode), etc., or a light-receiving element such as PD (photodiode), etc., and the IC chip 36 constitutes a driver circuit for the light-emitting element or an amplifier circuit for the light-receiving element.

The mirror surface 30 and the photoelectric conversion element 34 are arranged at positions opposite to each other with the flexible printed circuit board 16 interposed therebetween. Accordingly, light which passes through the core 26 and is then reflected by the mirror surface 30 transmits through the flexible printed circuit board 16 and is incident on the photoelectric conversion element 34. Meanwhile, light output from the photoelectric conversion element 34 transmits through the flexible printed circuit board 16 and is reflected by the mirror surface 30, and subsequently passes through the core 26 and is incident on the end face of the optical fiber 8.

Figure 4:
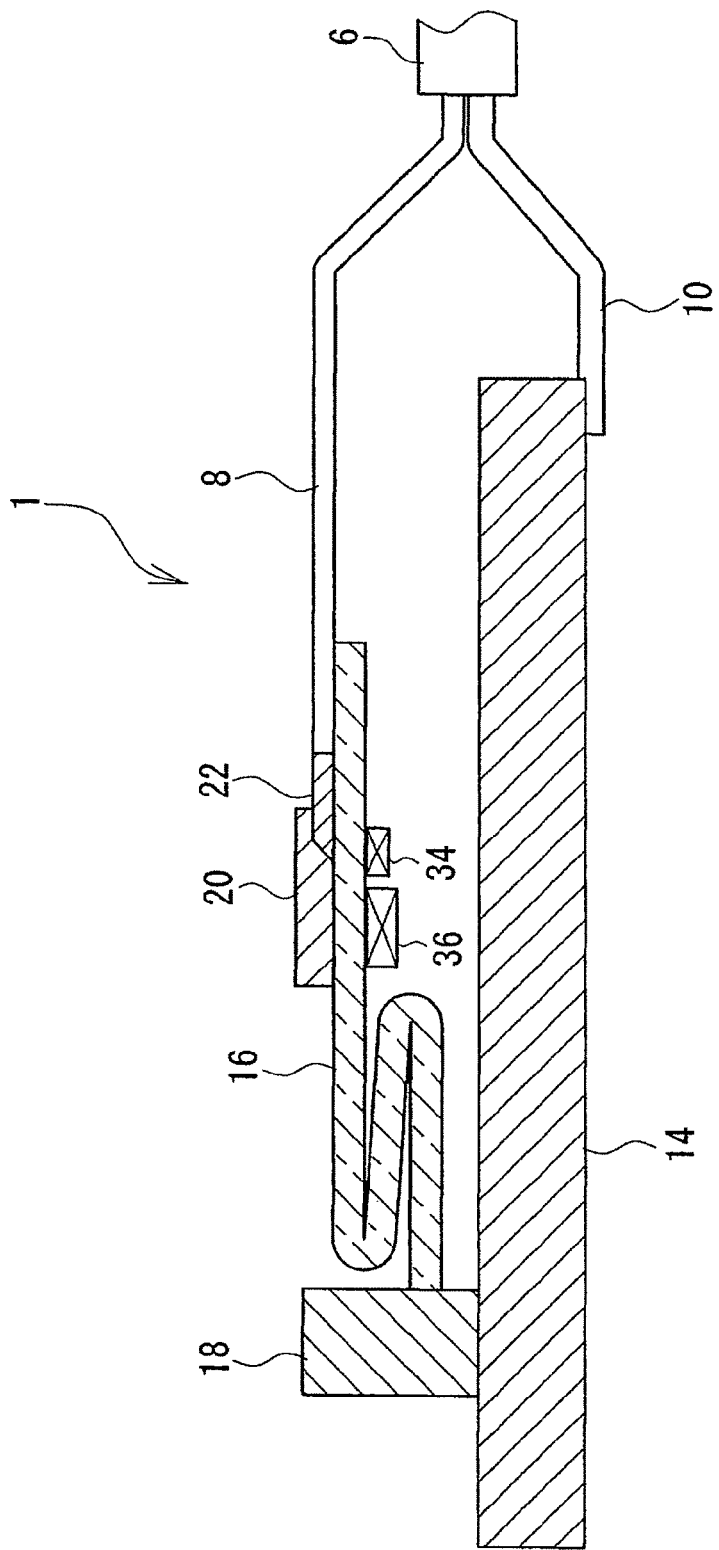
FIG. 4 is a cross sectional view showing the photoelectric transmission module taken along line IV-IV in FIG. 2.
Figure 5:
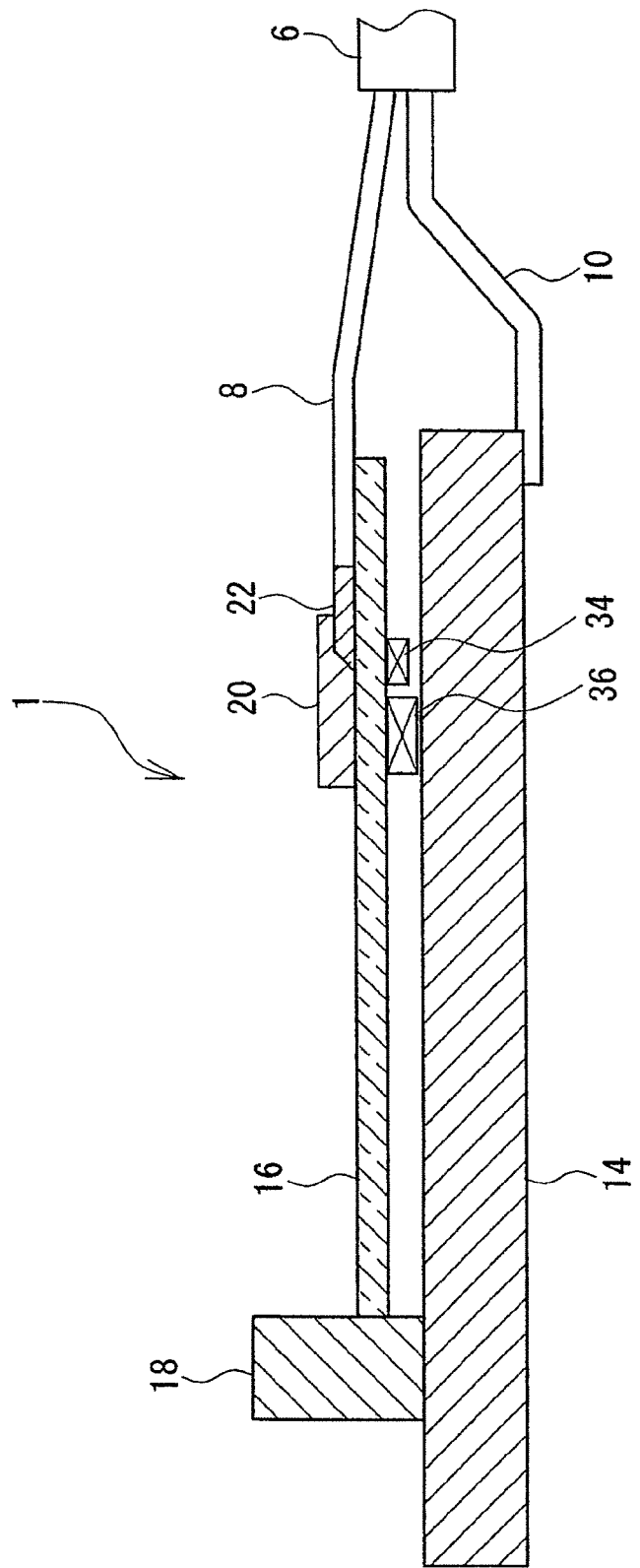
FIG. 5 is a cross sectional view showing a state that the photoelectric transmission module shown in FIG. 4 is pulled in a contraction direction of an optical fiber.

FIG. 4 is a cross sectional view showing the photoelectric transmission module 1 taken along line IV-IV in FIG. 2. Meanwhile, FIG. 5 is a cross sectional view showing a state that the photoelectric transmission module 1 shown in FIG. 4 is pulled in a contraction direction of the optical fiber 8. It should be noted that an illustration of the plate 21 is omitted in FIGS. 4 and 5.

A conductor pattern (not shown) is formed on the lower surface of the substrate 14, and the electrical wire 10 is soldered to the conductor pattern. In addition, the electrodes 14a are also connected to the conductor pattern, and the electrical wire 10 is thereby electrically connected to the electrodes 14a via the conductor pattern.

As described above, the overall length of the flexible printed circuit board 16 is enough longer than the length, when viewed in a direction along the substrate 14, of the distance between the connection end with FPC connector 18 and the optical fiber 8. That is, in this example, a long enough extra length is added to a section of the flexible printed circuit board 16 from the arrangement positions of the reinforcement plate 20, the photoelectric conversion element 34 and the IC chip 36, etc., to the connection end with FPC connector 18. This section is to transmit an electrical signal converted by the photoelectric conversion element 34 and an electrical signal output from the FPC connector 18 (hereinafter, a section for transmitting an electrical signal is referred to as "an electrical signal transmission section"). In an initial state before contraction and deformation of the optical fiber 8, the electrical signal transmission section is folded over in a Z-shape.

When tension is applied to the optical fiber 8 in the state described above, the flexible printed circuit board 16 is pulled in a tension direction from the connection end of the optical fiber 8. The connection end of the optical fiber 8 is displaced in a contraction direction thereof since the electrical signal transmission section has an enough long overall length, and it is thereby possible to retrieve the contracted length of the optical fiber 8. As described above, by providing a folded-over region (configured as a displacement permitting area) in the electrical signal transmission section, the flexible printed circuit board 16 allows the connection end thereof with the FPC connector 18 and that with the optical fiber 8 to be relatively displaced in accordance with deformation of the folded-over region.

In FIG. 5, the state in which the flexible printed circuit board 16 is greatly stretched by contraction of the optical fiber 8 is very exaggeratingly shown. Even if extreme contraction of the optical fiber 8 to that extent occurs, only the folded-over region of the flexible printed circuit board 16 is unfolded and tensile stress is not generated at the FPC connector 18 acting as a fixed end. This reduces tension applied to the optical fiber 8 and it is thus possible to surely prevent damage thereto. On the other hand, when the optical fiber 8 is displaced so as to further protrude from the photoelectric composite cable 6, the connection end of the optical fiber 8 moves toward the FPC connector 18 and reduces the tension applied to the optical fiber 8. Therefore, it is possible to surely prevent damage to the optical fiber also in this case.

Modification 1

Next, a modification 1 of the first embodiment will be described. Although the extra length is added to the electrical signal transmission section of the flexible printed circuit board 16 in the first embodiment, the modification 1 is different therefrom in that an extra length is added to a section for transmitting an optical signal, which is from the connection end of the optical fiber 8 to the arrangement positions of the reinforcement plate 20, the photoelectric conversion element 34 and the IC chip 36 (hereinafter, a section for transmitting an optical signal is referred to as "optical signal transmission section"). In addition, the illustration of the plate 21 is omitted in the modification 1 and below-described the modifications 2 to 4.

Figure 6:
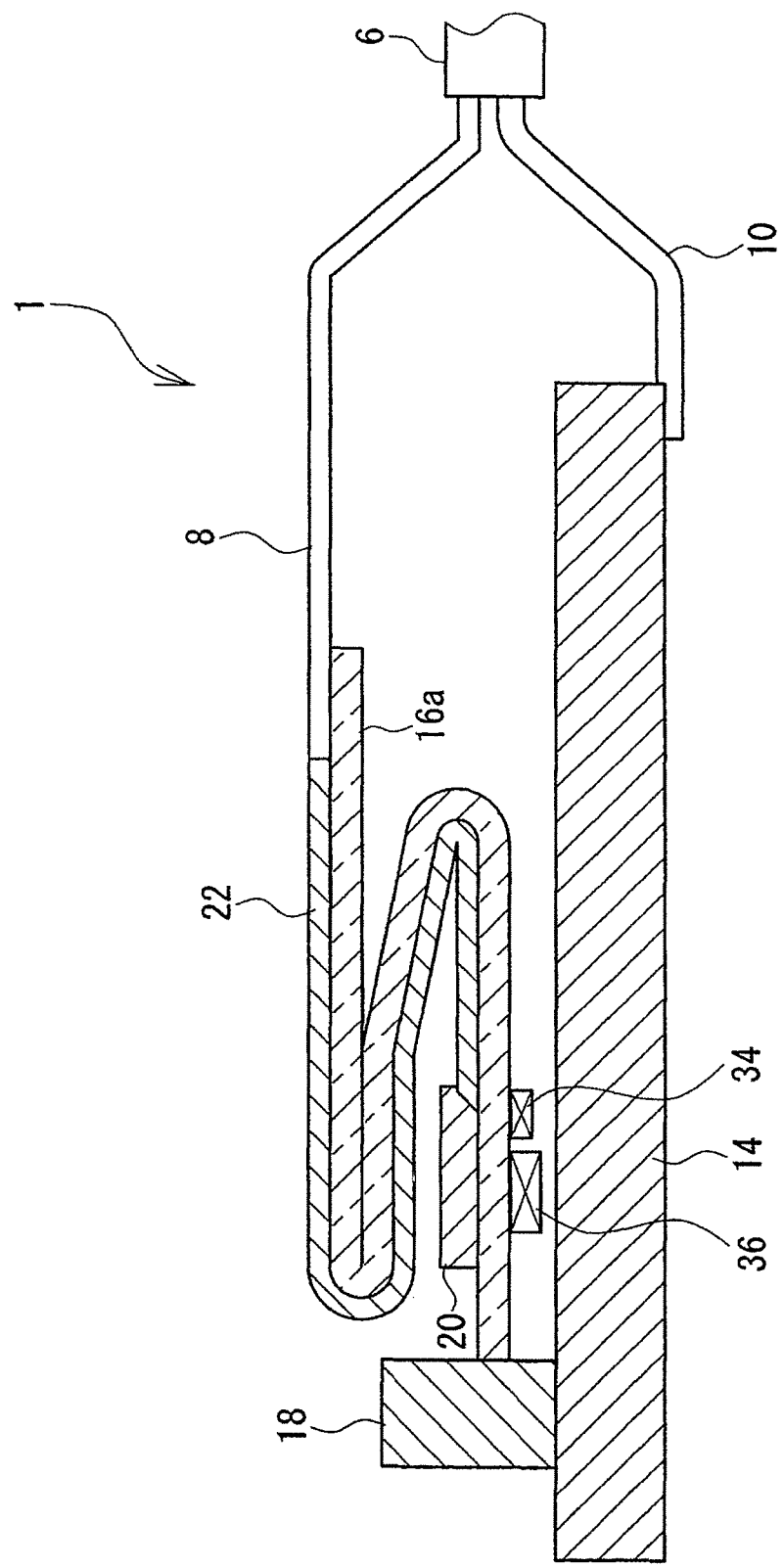
FIG. 6 is a cross sectional view showing a modification 1 of a photoelectric transmission module in a first embodiment.

FIG. 6 is a cross sectional view showing the modification 1 of the photoelectric transmission module 1 in the first embodiment.

In a flexible printed circuit board 16a, an extra length is added to the optical signal transmission section as described above, and in FIG. 6, the optical signal transmission section is folded over in a Z-shape in an initial state which is before contraction and deformation of the optical fiber 8. Meanwhile, similar to the optical signal transmission section, the extra length is also added to the polymer waveguide 22 and the entire polymer waveguide 22 is folded over in a Z-shape in the same manner as the optical signal transmission section.

As described above, by providing a folded-over region (configured as a displacement permitting area) in the optical signal transmission section, the flexible printed circuit board 16a allows the connection end thereof with the FPC connector 18 and that with the optical fiber 8 to be relatively displaced in accordance with deformation of the folded-over region. That is, in the modification 1, when tension is applied to the flexible printed circuit board 16a from the optical fiber 8, the folded-over portion is stretched in a contraction direction of the optical fiber 8. This reduces the tension applied to the optical fiber 8 and it is thus possible to surely prevent damage thereto. On the other hand, when the optical fiber 8 is displaced so as to further protrude from the photoelectric composite cable 6, the connection end of the optical fiber 8 moves toward the FPC connector 18 and reduces the tension applied to the optical fiber 8. Therefore, it is possible to surely prevent damage to the optical fiber also in this case.

Meanwhile, the photoelectric conversion element 34 and the IC chip 36 are less displaced even if the optical fiber 8 is displaced since the photoelectric conversion element 34 and the IC chip 36 are arranged near the FPC connector 18, hence, reliability is further increased.

Modification 2

Figure 7:
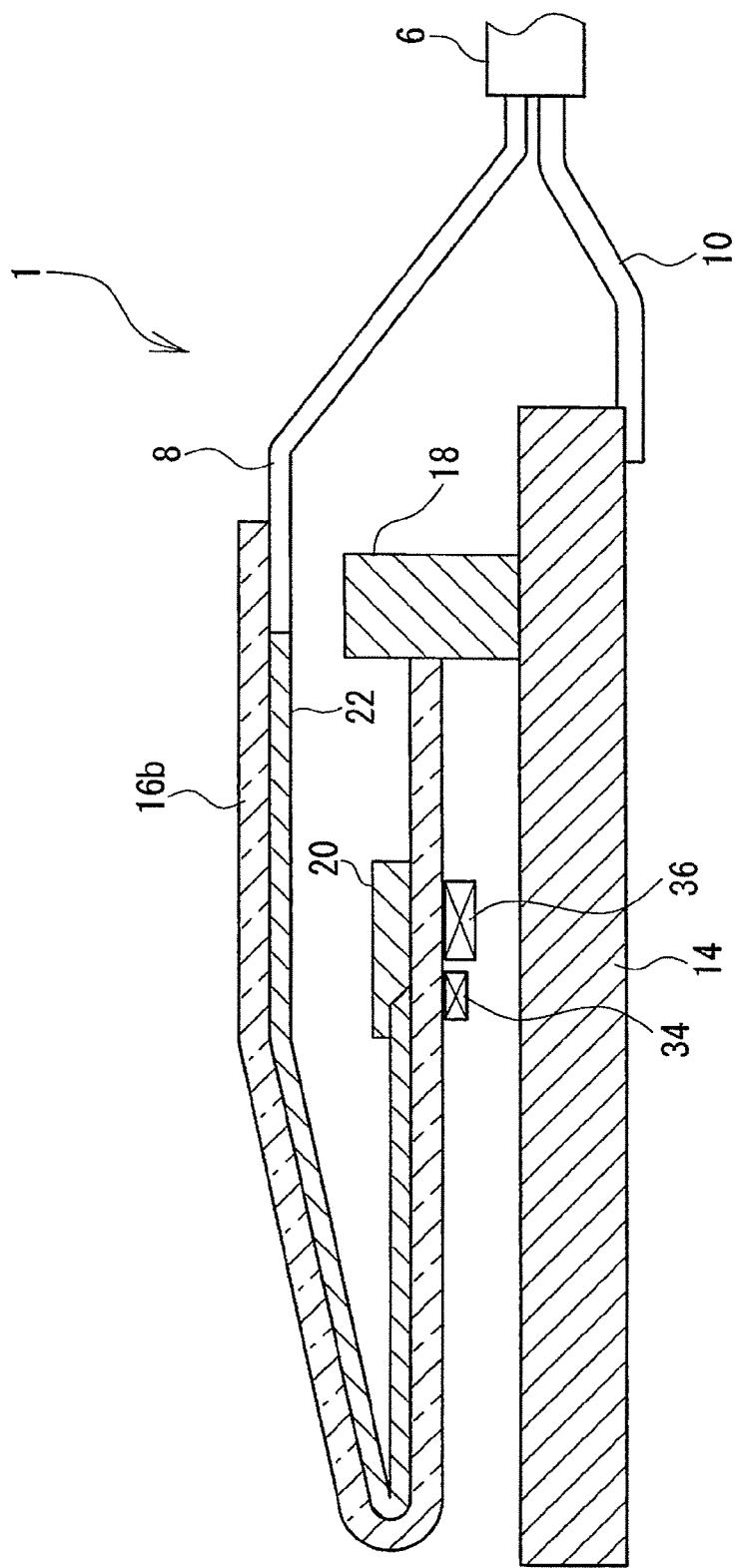
FIG. 7 is a cross sectional view showing a modification 2 of the photoelectric transmission module in the first embodiment.

Next, a modification 2 of the photoelectric transmission module 1 in the first embodiment will be described. FIG. 7 is a cross sectional view showing the modification 2 of the photoelectric transmission module 1 in the first embodiment. In the modification 2, an extra length is added to an optical signal transmission section of a flexible printed circuit board 16b as well as to the polymer waveguide 22 in the same manner as the modification 1, however, the arrangement position of the FPC connector 18 is different from the first embodiment and the modification 1 thereof.

In the modification 2, the FPC connector 18 is arranged at a longitudinal end of the substrate 14 close to the photoelectric composite cable 6, i.e., an end close to an opening for letting in the photoelectric composite cable 6 inside the housing 4. Meanwhile, the flexible printed circuit board 16b extends from the connection end of the FPC connector 18 toward another end of the substrate 14, i.e., toward an end portion having the electrodes 14a formed thereon (see FIGS. 1 and 2), and is then reversely folded back in a direction of the one end.

The reinforcement plate 20, the photoelectric conversion element 34 and the IC chip 36, etc., are arranged at an end of the flexible printed circuit board 16b close to the FPC connector 18. In this case, an extra length is added to the optical signal transmission section, and the flexible printed circuit board 16b is folded in two using the extra length.

In the modification 2, when tension by the optical fiber 8 is applied to the flexible printed circuit board 16b, the connection end of the flexible printed circuit board 16b with the optical fiber 8 is pulled in a tension direction. At this time, the optical signal transmission section connected to the connection end of the optical fiber 8 also moves in a tension direction to allow the contraction of the optical fiber 8. On the other hand, when the optical fiber 8 is displaced so as to further protrude from the photoelectric composite cable 6, the connection end of the optical fiber 8 moves toward an end portion having the electrodes 14a formed thereon also in the modification 2 to absorb protrusion of the optical fiber 8. As described above, by providing a folded-back region (configured as a displacement permitting area) in the optical signal transmission section, the flexible printed circuit board 16b allows the connection end thereof with the FPC connector 18 and that with the optical fiber 8 to be relatively displaced in accordance with deformation of the folded-back region. As a result, it is possible to surely prevent an optical fiber from being damaged due to contraction caused by an external force or temperature variation even in the form of the modification 2.

In addition, since the length for folding back the flexible printed circuit board 16b can be long, the flexible printed circuit board 16b can have a large bend radius and it is thereby possible to increase reliability.

Alternatively, another reinforcement plate may be adhered to the lower surfaces of the photoelectric conversion element 34 and the IC chip 36, and be further fixed to the mounting surface of the substrate 14.

Modification 3

Figure 8:
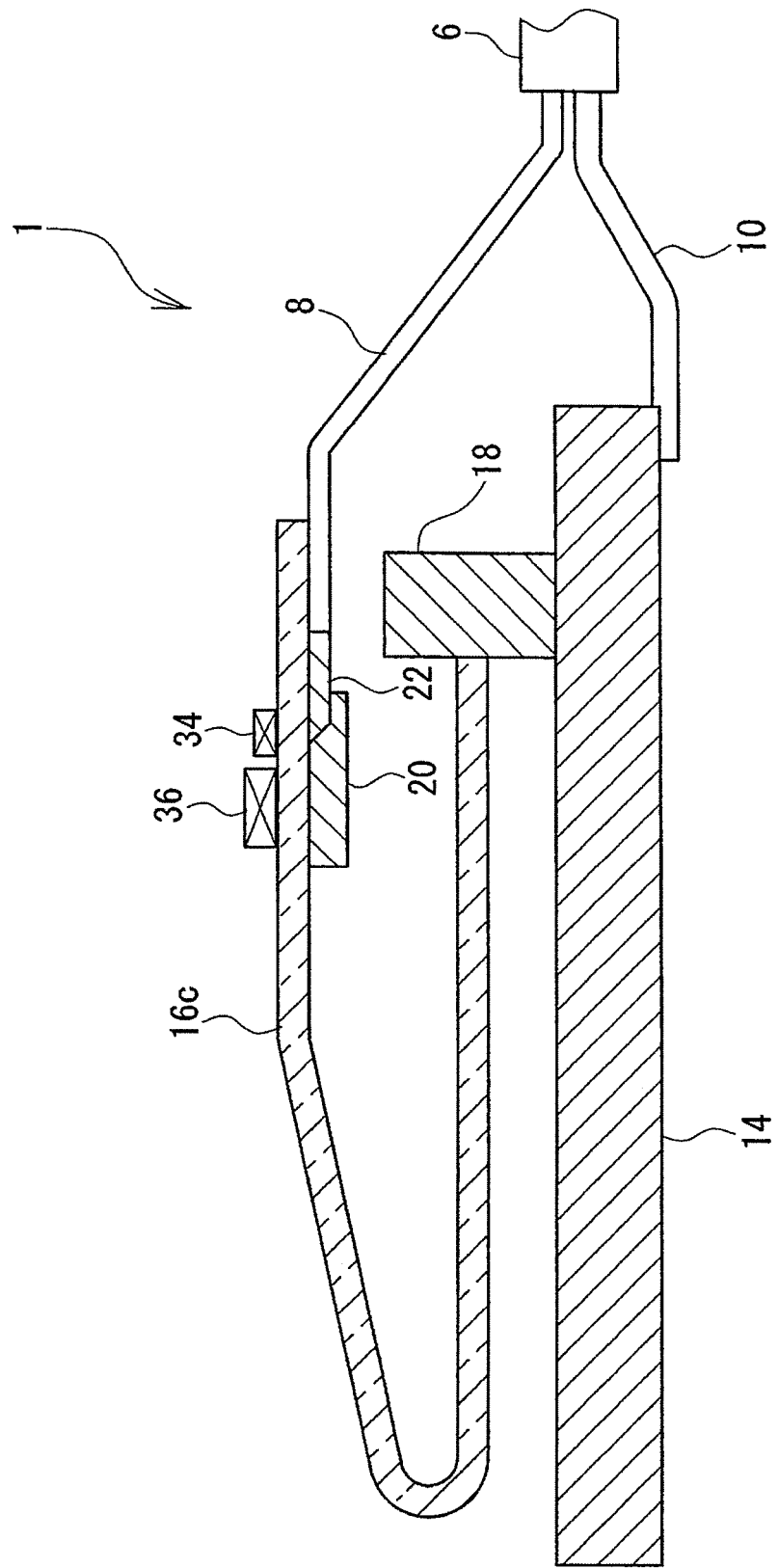
FIG. 8 is a cross sectional view showing a modification 3 of the photoelectric transmission module in the first embodiment.

Next, a modification 3 of the photoelectric transmission module 1 in the first embodiment will be described. FIG. 8 is a cross sectional view showing a modification 3 of the photoelectric transmission module 1 in the first embodiment. The photoelectric transmission module 1 in the modification 3 is different from the modification 2 in that an extra length is added to the electrical signal transmission section of a flexible printed circuit board 16c.

In the photoelectric transmission module 1 in the modification 3, the FPC connector 18 is arranged at the longitudinal end of the substrate 14 close to the photoelectric composite cable 6 in the same manner as the modification 2. Meanwhile, the flexible printed circuit board 16c also extends from the connection end of the FPC connector 18 toward the other end of the substrate 14, and is then reversely folded back in a direction of the one end.

However, the reinforcement plate 20, the photoelectric conversion element 34 and the IC chip 36, etc., are arranged between the folded position and the connection end of the optical fiber 8. In this case, an extra length is added to the electrical signal transmission section and the flexible printed circuit board 16c is folded in two using the extra length.

As described above, by providing a folded-back region (configured as a displacement permitting area) in the electrical signal transmission section, the flexible printed circuit board 16c allows the connection end thereof with the FPC connector 18 and that with the optical fiber 8 to be relatively displaced in accordance with deformation of the folded-back region. That is, when tension by the optical fiber 8 is applied to the flexible printed circuit board 16c, the connection end of the flexible printed circuit board 16c with the optical fiber 8 is pulled in a tension direction also in the form of the modification 3. Accordingly, the optical signal transmission section moves in a tension direction to allow the contraction of the optical fiber 8. On the other hand, when the optical fiber 8 is displaced so as to further protrude from the photoelectric composite cable 6, a region, continued from the contraction of the optical fiber 8, of the flexible printed circuit board 16c moves toward the folded position to reduce the tension applied to the optical fiber 8. The tension applied to the optical fiber 8 by expansion and contraction thereof is reduced as described above and it is thereby possible to surely prevent damage thereto.

Modification 4

Figure 9:
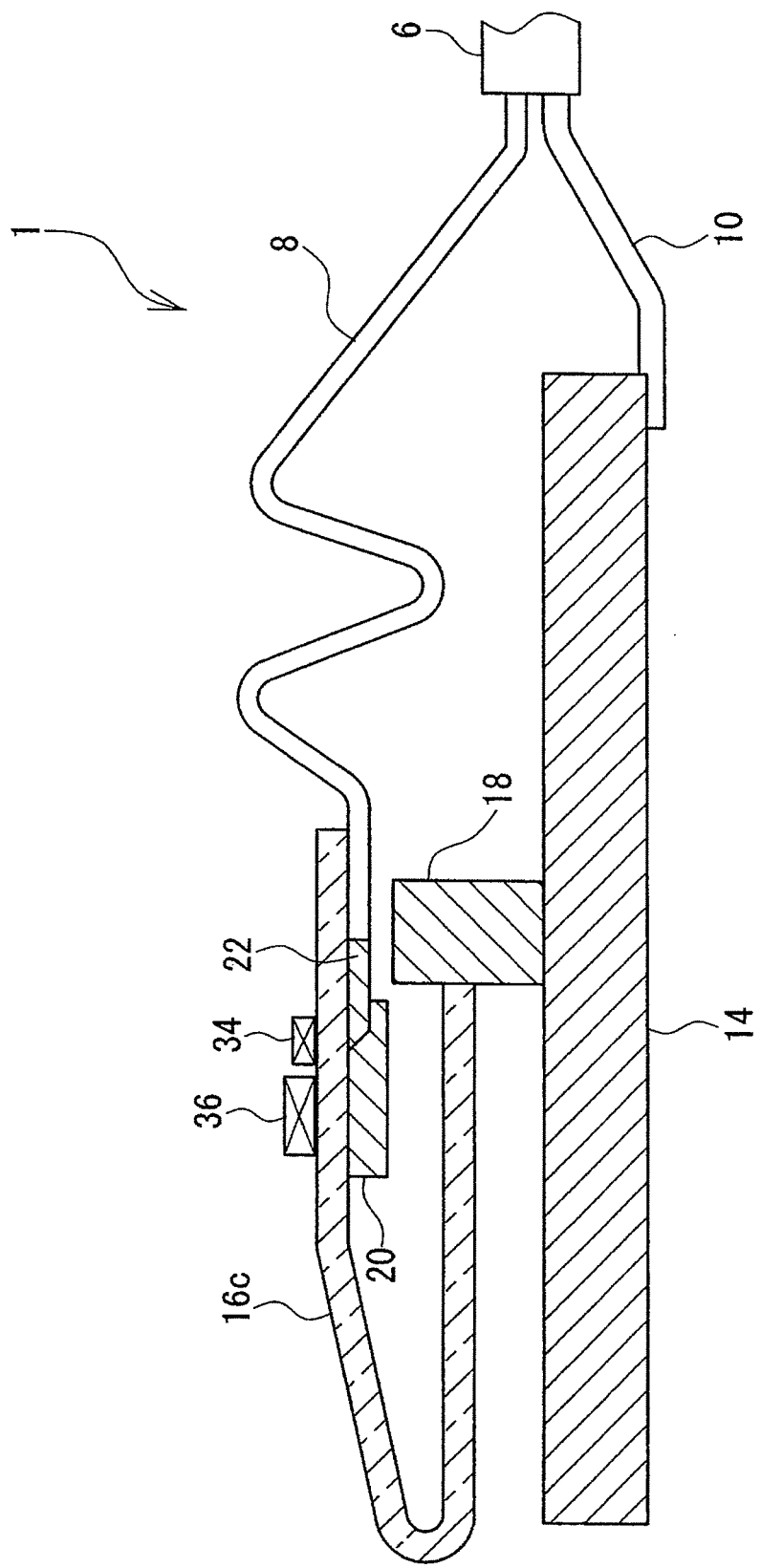
FIG. 9 is a cross sectional view showing a modification 4 of the photoelectric transmission module in the first embodiment.

FIG. 9 is a cross sectional view showing a modification 4 of the photoelectric transmission module 1 in the first embodiment. The modification 4 is different from the first embodiment and the modifications 1 to 3 in that an extra length is added to the flexible printed circuit board 16c as well as to the optical fiber 8. On the other hand, the basic structure of the photoelectric transmission module 1 in the modification 4 is in common with that in modification 3, and the common members are denoted by the same reference numerals.

In the configuration described above, since the extra length is also added to the optical fiber 8, the optical fiber 8 can be connected to the flexible printed circuit board 16c in a deflected state. Therefore, even if the optical fiber 8 is contracted or tension is applied thereto, the deflected portion is deformed to allow tension to be reduced. Furthermore, even if the optical fiber 8 is fully deformed, the flexible printed circuit board 16c takes over the deformation of the optical fiber 8 and it is thereby possible to surely prevent damage thereto.

Second Embodiment

Next, the second embodiment will be described. The second embodiment is different from the first embodiment in that the layout of a flexible printed circuit board 40 and the FPC connector 18 is changed and that the flexible printed circuit board 40 is not folded over. Other components same as those in the first embodiment are shown with the same reference numerals and the duplicative explanations will be omitted.

Figure 10:
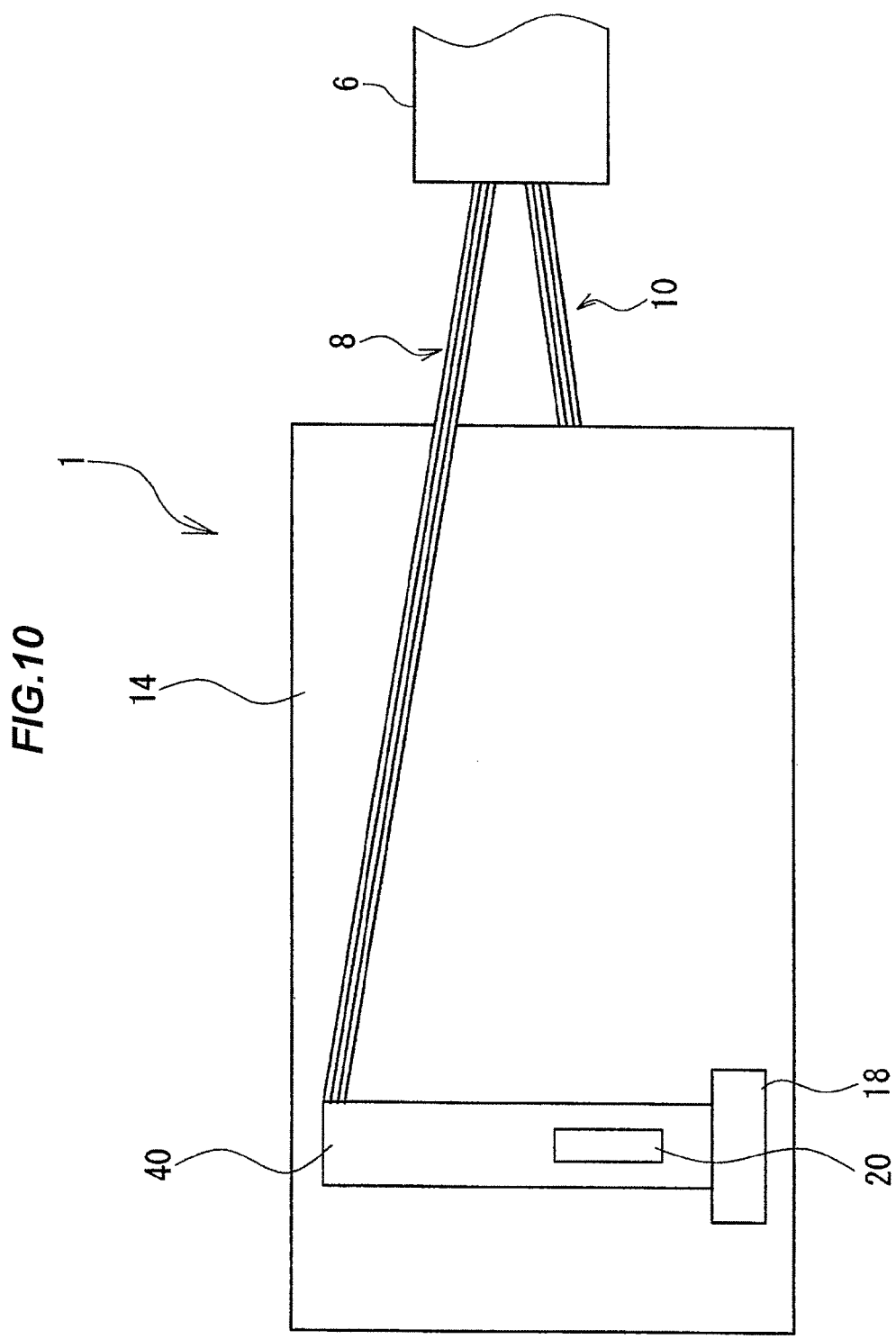
FIG. 10 is a schematic plan view showing a photoelectric transmission module in a second embodiment.
Figure 11:
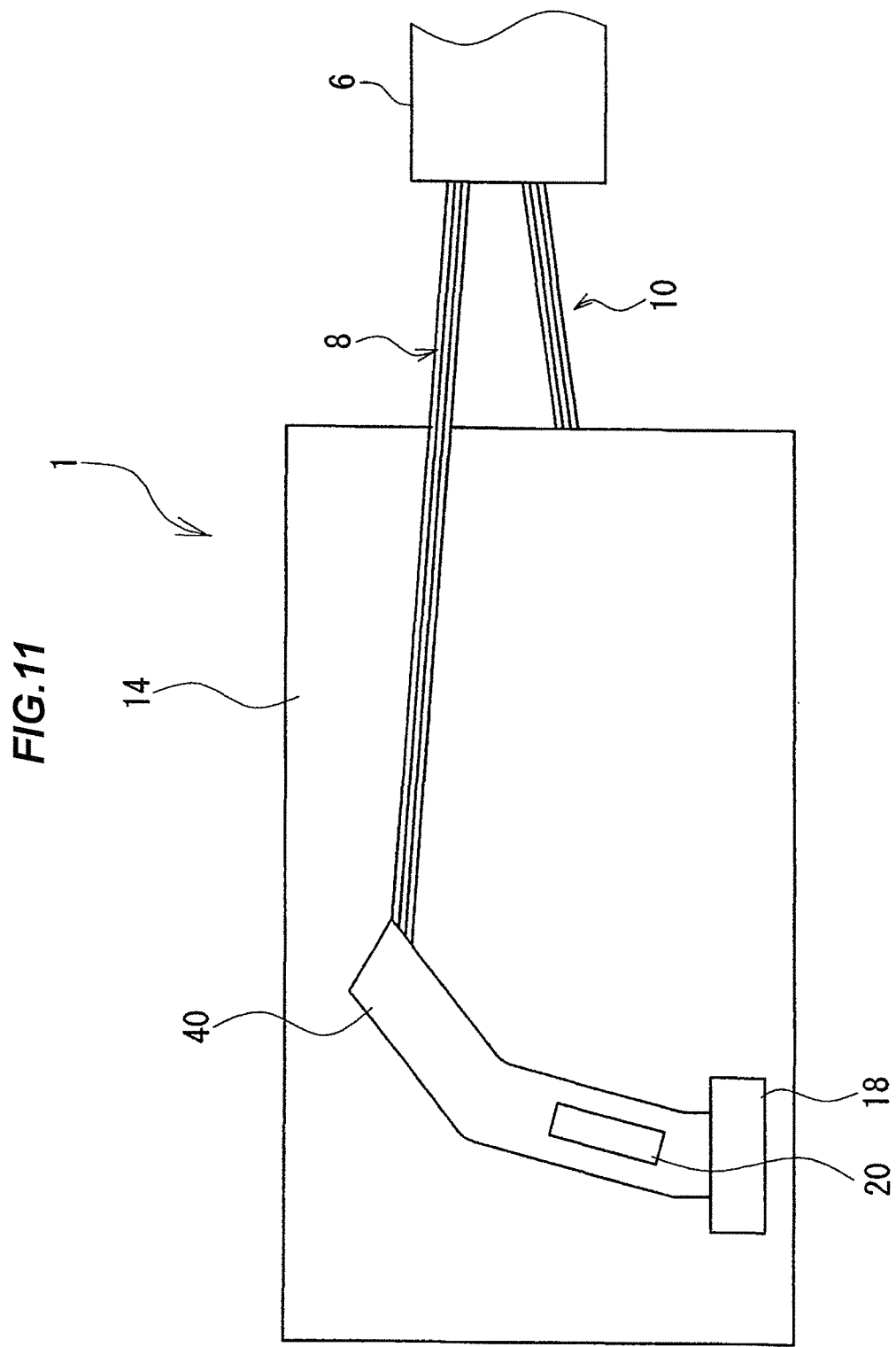
FIG. 11 is a schematic plan view showing a state that the flexible printed circuit board shown in FIG. 10 is pulled in a tension direction.

FIG. 10 is a schematic plan view showing the photoelectric transmission module 1 in the second embodiment. In addition, FIG. 11 is a schematic plan view showing a state that the flexible printed circuit board 40 shown in FIG. 10 is pulled in a tension direction.

In the second embodiment, the longitudinal direction of the flexible printed circuit board 40 is not coincident with the longitudinal direction of the substrate 14 but a width direction of the substrate 14 (a direction crossing the longitudinal direction). Therefore, the connection end of the FPC connector 18 faces in the width direction of the substrate 14, and the flexible printed circuit board 40 connected to the FPC connector 18 extends from the connection end thereof in the width direction of the substrate 14. Note that, a conductor pattern (not shown) is formed on the lower surface of the substrate 14 and the electrical wire 10 is soldered to the conductor pattern even though the illustration is omitted. In addition, the electrodes 14a are also connected to the conductor pattern, and the electrical wire 10 is thereby electrically connected to the electrodes 14a via the conductor pattern.

The optical fiber 8 is connected to a side rim of the flexible printed circuit board 40 opposite to the connection end of the FPC connector 18. In addition, the reinforcement plate 20 is arranged on the upper surface (a mounting surface) of the flexible printed circuit board 40, and the photoelectric conversion element 34 and the IC chip 36 (not shown in FIG. 10) are arranged on the opposite surface, i.e., the back surface. It should be noted that a polymer waveguide is formed on the mounting surface of the flexible printed circuit board 40 even though it is not shown in the drawing here. As shown in FIG. 11, when tension is applied to the optical fiber 8, the flexible printed circuit board 40 is pulled at the connection end of the optical fiber 8 in a tension direction thereof At this time, the flexible printed circuit board 40 can be entirely deformed in the tension direction of the optical fiber 8 not by deformation due to tension in a longitudinal direction but by generating deflection using the FPC connector 18 as a fixed end.

On the other hand, when the optical fiber 8 is displaced so as to further protrude from the photoelectric composite cable 6 in the second embodiment, deflection of the flexible printed circuit board 40 in a protrusion direction of the optical fiber 8 is generated using the FPC connector 18 as a fixed end.

As described above, the flexible printed circuit board 40 deforms in a direction along the substrate 14 to allow the connection end thereof with the FPC connector 18 and that with the optical fiber 8 to be relatively displaced. Alternatively, at this time, non-illustrated plural slits may be formed in a width direction of the flexible printed circuit board 40 in a section from the arrangement position of the reinforcement plate 20 to the connection end of the optical fiber 8. In this case, it is possible to further increase deformation by the deflection.

Modification 1

Figure 12:
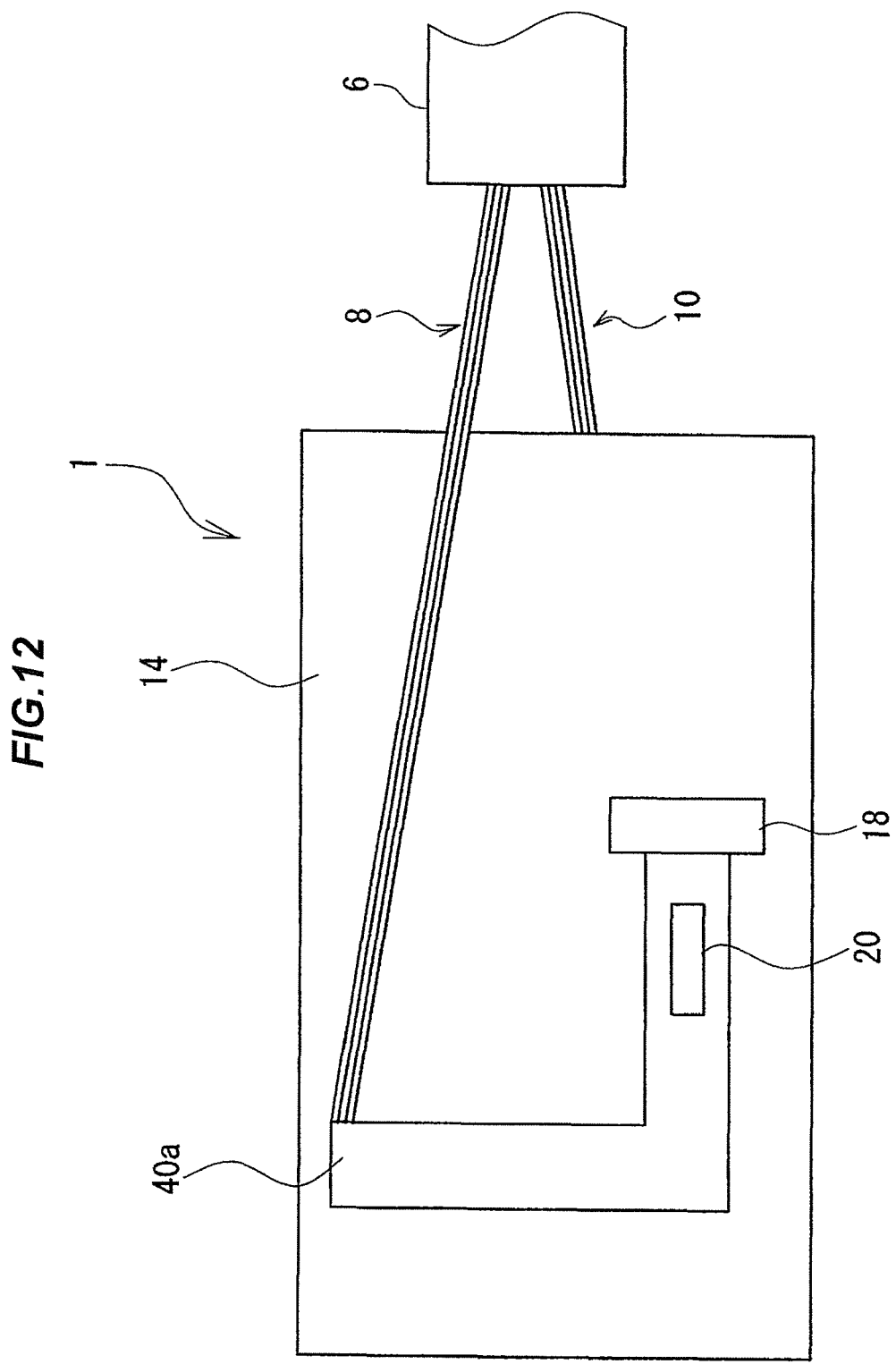
FIG. 12 is a plan view showing a modification 1 of the photoelectric transmission module shown in FIG. 10.

Next, a modification 1 of the photoelectric transmission module 1 in the second embodiment will be described. FIG. 12 is a plan view showing the modification 1 of the photoelectric transmission module 1 shown in FIG. 10. The photoelectric transmission module 1 in the modification 1 is different from the photoelectric transmission module 1 shown in FIG. 10 in the layout of the FPC connector 18 and the shape of the flexible printed circuit board.

The FPC connector 18 is arranged so that the connection end thereof faces in the longitudinal direction of the substrate 14. In addition, a flexible printed circuit board 40a is formed in an L-shape in a plan view. In more detail, the flexible printed circuit board 40a extends from the FPC connector 18 in the longitudinal direction of the substrate 14, is then bent 90°, and extends therefrom in a width direction. Then, the optical fiber 8 is connected to a side rim of the flexible printed circuit board 40a at the front end portion extended in a width direction of the substrate 14. As described above, the flexible printed circuit board 40a is composed of two linear regions (first and second regions) arranged in an L-shape.

The flexible printed circuit board 40a formed in an L-shape can also reduce the tension applied to the optical fiber 8 by absorbing tension caused by the contraction thereof. On the other hand, the flexible printed circuit board 40a also absorbs tension applied to the optical fiber 8 due to the protrusion thereof by deflecting in a tension direction.

As described above, a region of the flexible printed circuit board 40a from the connection end of the FPC connector 18 to the connection end of the optical fiber 8 deforms according to the tension by the optical fiber 8 to allow the connection end of the optical fiber 8 to be relatively displaced with respect to the connection end of the FPC connector 18. In other words, when the tension by the optical fiber 8 is applied, the flexible printed circuit board 40a deforms in the tension direction of the optical fiber 8 from the connection end of the FPC connector 18 to allow tension applied to the optical fiber to be reduced. As a result, it is possible to prevent the optical fiber 8 from being damaged.

Modification 2

Figure 13:
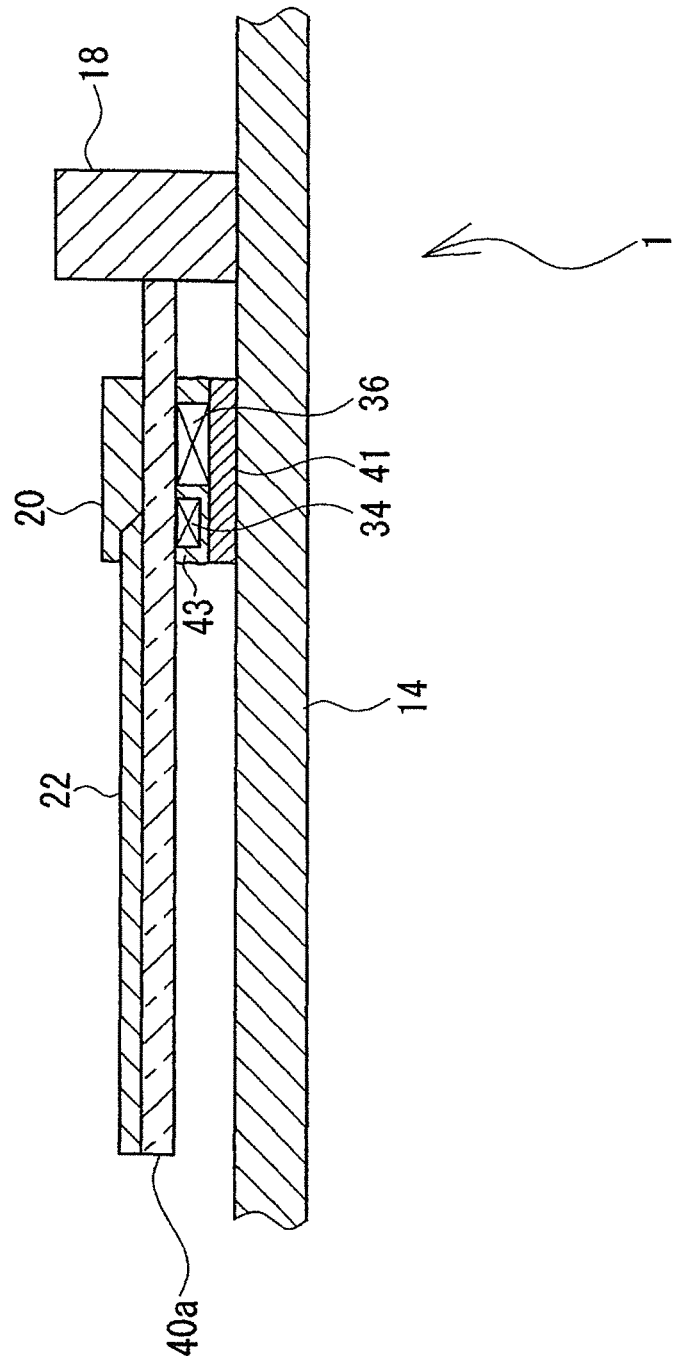
FIG. 13 is a vertical cross sectional view showing a structure of still another form of the photoelectric transmission module shown in FIG. 10 or 12.

Next, a modification 2 of the photoelectric transmission module 1 in the second embodiment will be described. FIG. 13 is a vertical cross sectional view showing a structure of still another form of the photoelectric transmission module 1 (the second embodiment and the modification 1 thereof) shown in FIG. 10 or 12. Here, another form shown in FIG. 13 is the modification 2 of the second embodiment. The modification 2 is different from the second embodiment and the modification 1 thereof in that the photoelectric conversion element 34 and the IC chip 36 are fixed to the substrate 14. Following is the explanation of the feature using the photoelectric transmission module 1 shown in modification 1 in which the flexible printed circuit board 40a is fixed to the substrate 14.

In the modification 2, the flexible printed circuit board 40a is fixed to an outer surface, when viewed in a thickness direction of the flexible printed circuit board 40a, of the substrate 14 within a range from the connection end of the FPC connector 18 to a position on the optical signal transmission section side beyond the arrangement position of the photoelectric conversion element 34 (up to the connection end of the optical fiber). In detail, the flexible printed circuit board 40a is fixed to the substrate 14 using a fixing plate 41 and an adhesive 43 which are arranged between the flexible printed circuit board 40a and the substrate 14 at a position opposite to the reinforcement plate 20.

The fixing plate 41 is fixed to the substrate 14, and a portion of an upper surface when viewed in a thickness direction of the fixing plate 41 is in contact with the IC chip 36. In addition, the adhesive 43 is applied between the fixing plate 41 and the flexible printed circuit board 40a to adhere therebetween while covering the IC chip 36 and the photoelectric conversion element 34. At this time, it is preferable that the adhesive 43 be widely applied up to the position on the polymer waveguide 22 side (the optical signal transmission section side) beyond the photoelectric conversion element 34. As a result, the electrical signal transmission section of the flexible printed circuit board 40a is fixed to the substrate 14 and it is possible to make the optical signal transmission section to be a displacement permitting area.

As described above, when the flexible printed circuit board 40a is fixed to the substrate 14, the optical signal transmission section of the flexible printed circuit board 40a for transmitting an optical signal deforms as the displacement permitting area, which allows the tension applied to the optical fiber 8 to be reduced and to prevent damage thereto.

Modification 3

Figure 14:
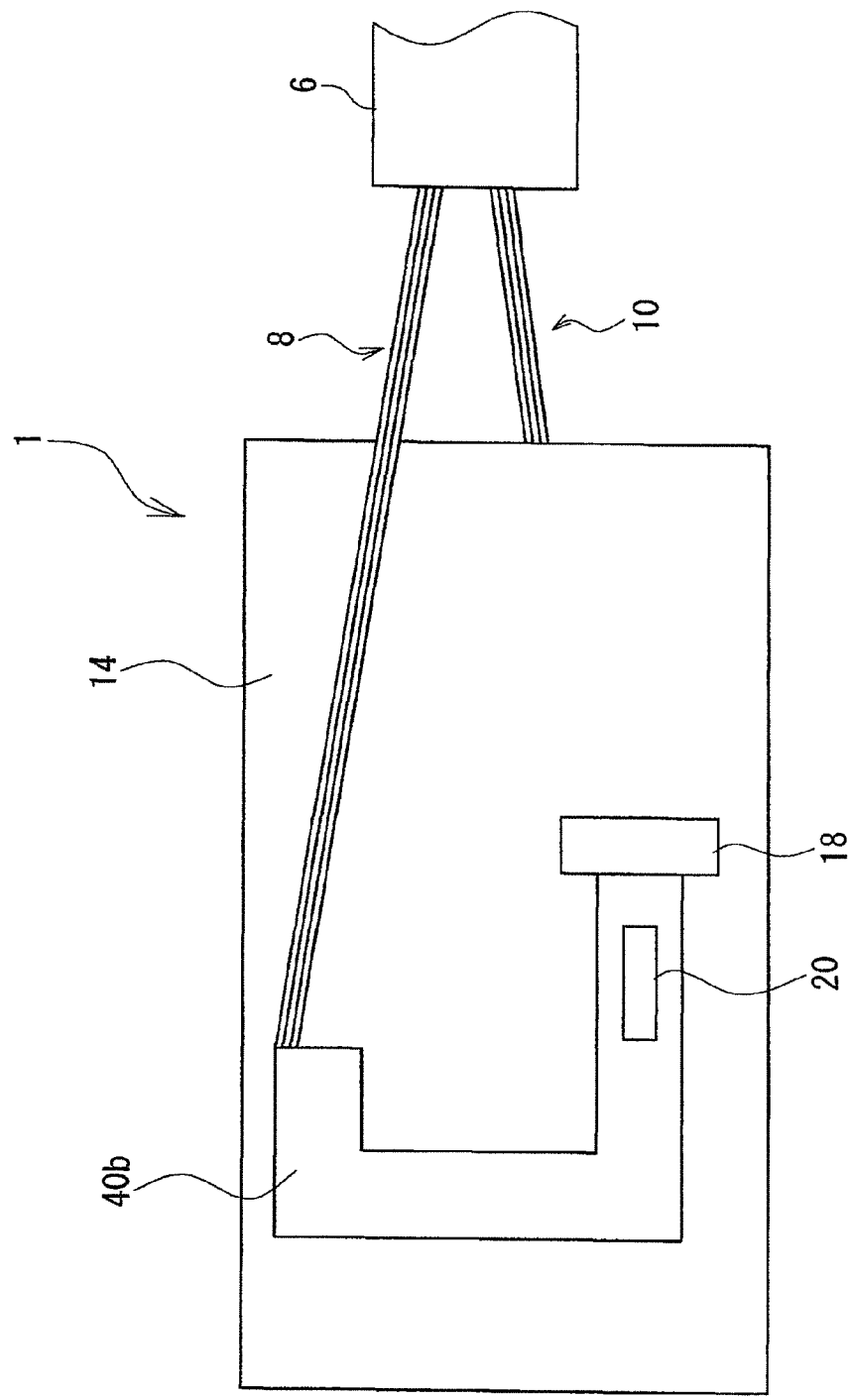
FIG. 14 is a plan view showing a modification 2 of the photoelectric transmission module in the second embodiment.

FIG. 14 is a plan view showing a modification 3 of the photoelectric transmission module 1 in the second embodiment. In the modification 3, a shape of a flexible printed circuit board 40b is different from the shapes of the flexible printed circuit boards 40 and 40a in the second embodiment and the modifications 1 and 2 thereof.

The flexible printed circuit board 40b used in the modification 3 is formed by further bending the front end portion of the flexible printed circuit board 40a in the modification 1 at 90° and extending the front end portion in the longitudinal direction of the substrate 14. Therefore, the flexible printed circuit board 40b used in the modification 3 is formed in a substantially squared U-shape in a plan view. In such a shape, the flexible printed circuit board 40b deforms according to the tension by the optical fiber 8 using the FPC connector 18 as a fixed end to allow the connection end with the FPC connector 18 and that with the optical fiber 8 to be relatively displaced. As described above, the flexible printed circuit board 40b is composed of three linear regions (first, second and third regions) arranged in a substantially squared U-shape.

Even in the case that the flexible printed circuit board 40b has the shape described above, the connection end of the optical fiber 8 moves in the tension direction of the optical fiber 8 when the optical fiber 8 is pulled in the tension direction due to the contraction thereof in the same manner as the flexible printed circuit board 40a in the second embodiment and the modifications 1 and 2 thereof. On the other hand, the connection end of the optical fiber 8 moves in a direction of force applied when the optical fiber 8 protrudes. As a result, it is possible to reduce the tension applied to the optical fiber 8 and to surely prevent damage thereto.

Alternatively, the fixing plate 41 may be fixed to the position opposite to the reinforcement plate 20 arranged on the flexible printed circuit board 40b and be further fixed to the substrate 14 in the same manner as the modification 2 shown in FIG. 13. When the fixing plate 41 is fixed to the flexible printed circuit board 40a and the substrate 14, the optical signal transmission section of the flexible printed circuit board 40a for transmitting an optical signal deforms, which allows the tension applied to the optical fiber 8 to the reduced and to prevent damage thereto.

Third Embodiment

Next, the photoelectric transmission module 1 in the third embodiment will be described. In the third embodiment, a heat dissipating member is further provided on the reinforcement plate 20 which is provided on the flexible printed circuit board 16 in the photoelectric transmission module 1 shown in the first and second embodiments and the modifications thereof.

Figure 15:
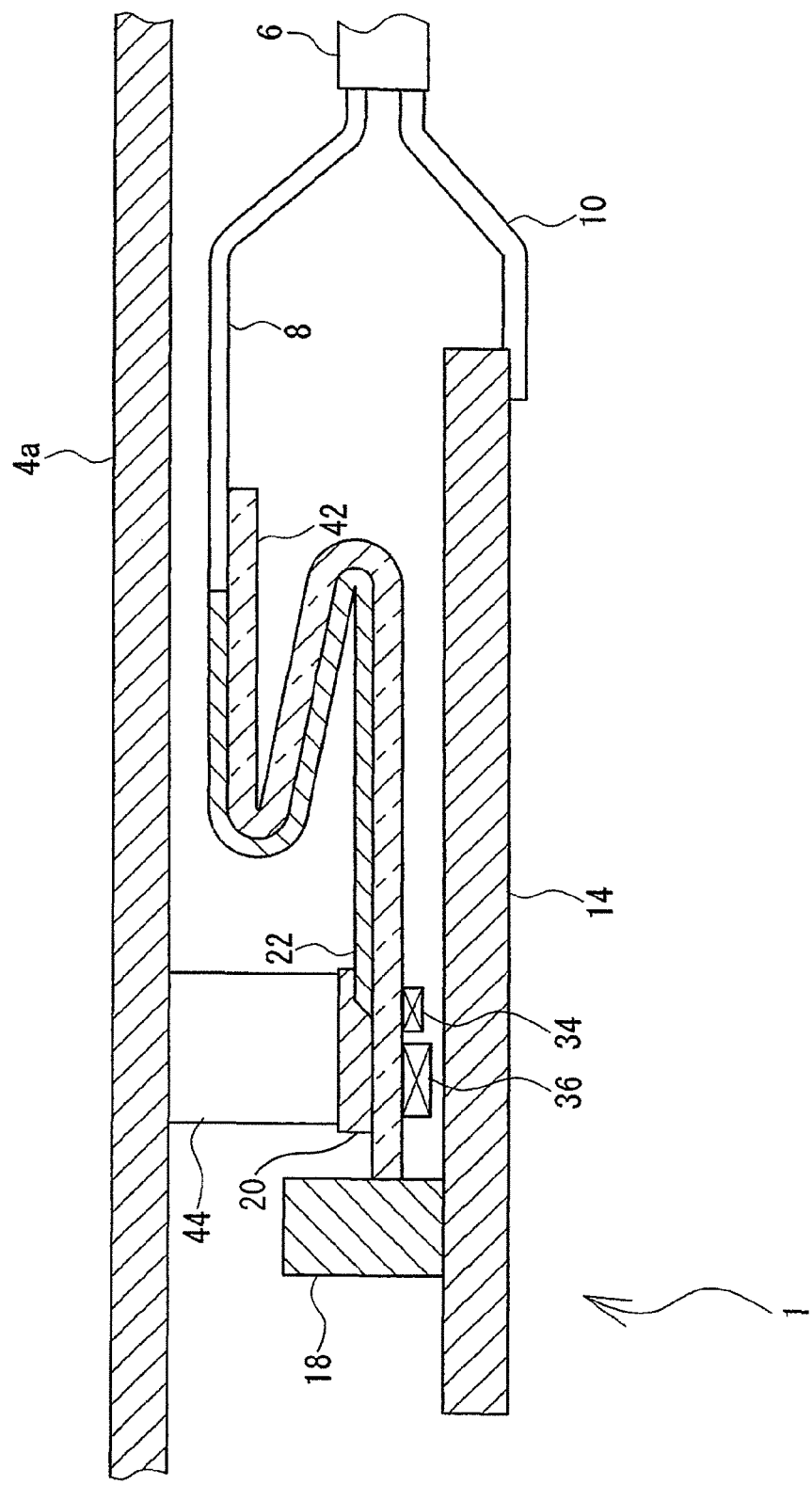
FIG. 15 is a cross sectional view showing a photoelectric transmission module in a third embodiment.

FIG. 15 is a cross sectional view showing the photoelectric transmission module 1 in the third embodiment. Here, a flexible printed circuit board 42 in which the optical signal transmission section shown in FIG. 6 is extended will be explained as an example.

In this case, a heat conductive sheet 44 as a heat dissipating member is adhered on the upper surface of the reinforcement plate 20. The heat conductive sheet 44 is adhered to the inner surface of the case 4a which is arranged further above the reinforcement plate 20.

As described above, by using the heat conductive sheet 44, heat released from the photoelectric conversion element 34 and the IC chip 36 are transmitted to the reinforcement plate 20, and the heat transmitted to the reinforcement plate 20 can be efficiently released to the case 4a through the heat conductive sheet 44. In addition, since an extra length is added to, e.g., an optical signal transmission section in the flexible printed circuit board 42, it is possible to prevent damage to the optical fiber 8 in the same manner as the first embodiment.

Modification

Figure 16:
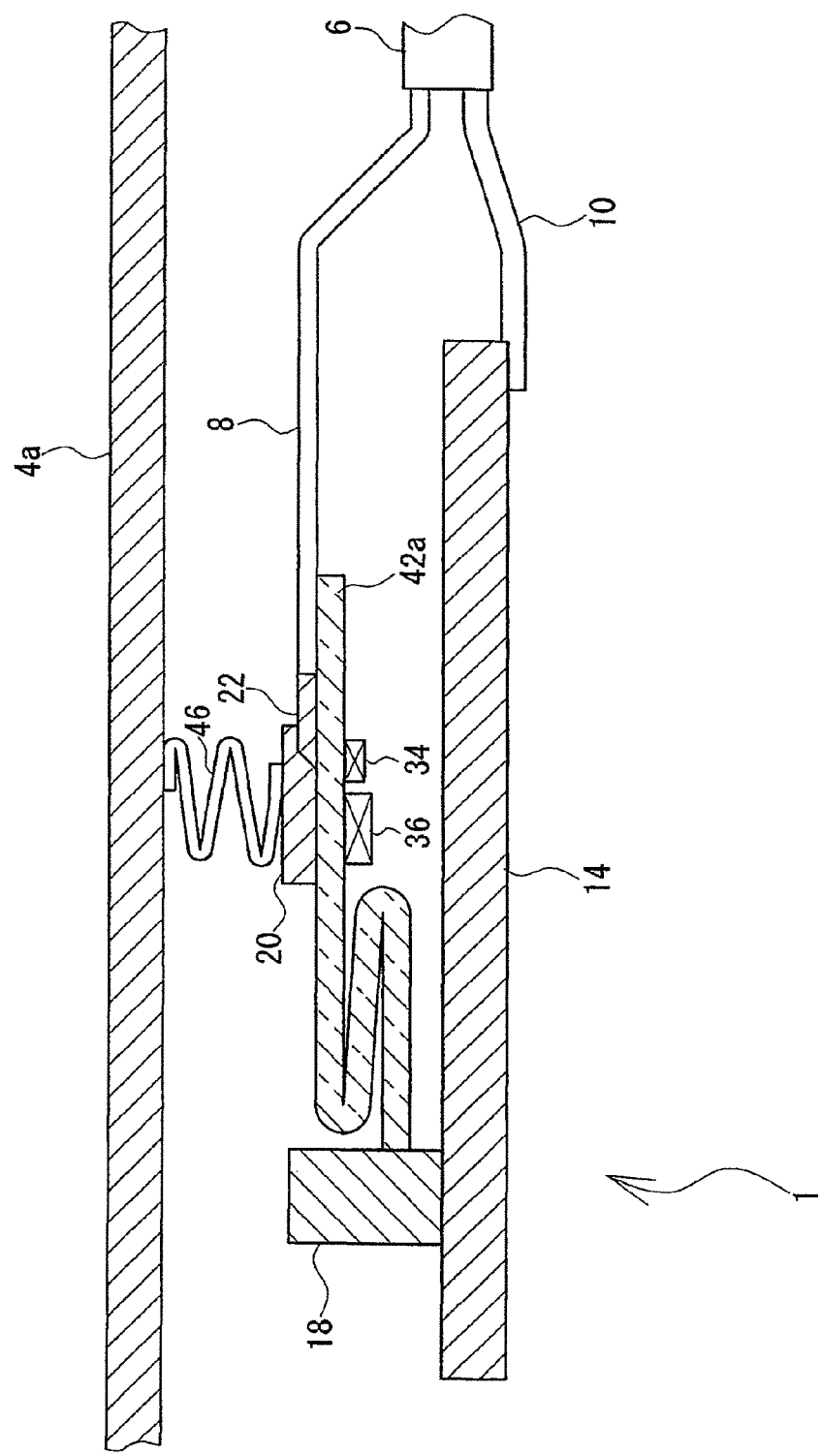
FIG. 16 is a cross sectional view showing a modification of the photoelectric transmission module in the third embodiment.

FIG. 16 is a cross sectional view showing a modification of the photoelectric transmission module 1 in the third embodiment. Here, the photoelectric transmission module 1 using a flexible printed circuit board 42a in which an extra length is added to the electrical signal transmission section will be explained as an example.

In the flexible printed circuit board 42a, an extra length is added to the electrical signal transmission section, and the reinforcement plate 20 is arranged so as to be movable, together with the electrical signal transmission section, in the tension direction of the optical fiber 8. In this modification, for example, a carbon tape 46 is used as a heat dissipating member and is adhered to the reinforcement plate 20 and the case 4a.

The length of the carbon tape 46 is preferably predetermined by taking into consideration a movement distance from the initial position of the reinforcement plate 20 due to the contraction of the optical fiber 8. As a result, it is possible to prevent the carbon tape 46 from peeling off from the reinforcement plate 20 or from the inner surface of the case 4a when the reinforcement plate 20 moves in the tension direction of the optical fiber 8.

The present invention is not limited to the first to third embodiments and the modifications thereof, and various changes can be made. For example, the polymer waveguide 22 may be arranged in a section from the mirror surface 30 to the connection end of the FPC connector 18. In addition, a through-hole may be formed in the flexible printed circuit board 16 between the mirror surface 30 and the photoelectric conversion element 34 in a thickness direction.

In addition, the shape of the flexible printed circuit board 40 in the second embodiment only needs to allow the connection end of the optical fiber 8 to move in a tension direction, and the layout of the flexible printed circuit board 40 and the FPC connector 18 is not limited to the examples shown in FIGS. 10 to 13 and changes thereto can be made.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. A photoelectric transmission module for transmitting optical and electrical signals while being connected to a terminal of a composite cable comprising an optical fiber and an electrical cable, comprising: a substrate connected to the electrical cable drawn from the composite cable; a flexible printed circuit board comprising one end connected to a connector on the substrate and an other end connected to the optical fiber drawn from the composite cable; and an optical waveguide member formed along an outer surface of the flexible printed circuit board and connected to the optical fiber to transmit an optical signal, wherein the flexible printed circuit board further comprises a displacement permitting area formed in a section from a connection end of the connector to a connection end of the optical fiber to allow the connection end of the connector and the connection end of the optical fiber to be relatively displaced in a direction along the substrate.

2. The photoelectric transmission module according to claim 1, wherein the displacement permitting area is formed by folding over the section of the flexible printed circuit board from the connection end of the connector to the connection end of the optical fiber along the substrate.

3. The photoelectric transmission module according to claim 1, further comprising:
a photoelectric conversion element on an outer surface of the flexible printed circuit board opposite the outer surface with the optical waveguide member formed thereon to bilaterally convert the optical signal transmitted from the optical fiber via the optical waveguide member and an electrical signal transmitted from the connector; and an IC chip electrically connected to the photoelectric conversion element on the outer surface of the flexible printed circuit board opposite the outer surface with the optical waveguide member formed thereon, wherein the displacement permitting area is formed in an optical signal transmission section for transmitting an optical signal from an arrangement position of the photoelectric conversion element to the connection end of the optical fiber.

4. The photoelectric transmission module according to claim 1, further comprising:
a photoelectric conversion element on an outer surface of the flexible printed circuit board opposite the outer surface with the optical waveguide member formed thereon to bilaterally convert the optical signal transmitted from the optical fiber via the optical waveguide member and an electrical signal transmitted from the connector; and an IC chip electrically connected to the photoelectric conversion element on the outer surface of the flexible printed circuit board opposite the outer surface with the optical waveguide member formed thereon,
wherein the displacement permitting area is formed in an electrical signal transmission section for transmitting an electrical signal from the connection end of the connector to the arrangement position of the photoelectric conversion element.

5. The photoelectric transmission module according to claim 2, wherein, while the connection end of the connector is disposed at one end of the substrate, a section of the flexible printed circuit board from the connection end of the connector to the connection end of the optical fiber is once extended toward an other end of the substrate and is then folded back toward the one end of the substrate by turning back at the other end of the substrate, such that both the connection end of the connector and the connection end of the optical fiber are located on the one side of the substrate.

6. A photoelectric transmission module for transmitting optical and electrical signals while being connected to a terminal of a composite cable comprising an optical fiber and an electrical cable, comprising: a substrate connected to the electrical cable drawn from the composite cable; a flexible printed circuit board comprising one end connected to a connector provided on the substrate and an other end connected to the optical fiber drawn from the composite cable; and an optical waveguide member formed along an outer surface of the flexible printed circuit board and connected to the optical fiber to transmit an optical signal, wherein the flexible printed circuit board further comprises a displacement permitting area formed in a section from a connection end of the connector to a connection end of the optical fiber and extending in a direction crossing a longitudinal direction of the optical fiber at least partially drawn from the composite cable to allow the connection end of the connector and the connection end of the optical fiber to be relatively displaced in a direction along the substrate with deformation of the displacement permitting area.

7. The photoelectric transmission module according to claim 6, further comprising:
a photoelectric conversion element on an outer surface of the flexible printed circuit board opposite the outer surface with the optical waveguide member formed thereon to bilaterally convert the optical signal transmitted from the optical fiber via the optical waveguide member and an electrical signal transmitted from the connector; and an IC chip electrically connected to the photoelectric conversion element on the outer surface of the flexible printed circuit board opposite the outer surface with the optical waveguide member formed thereon, wherein, in the displacement permitting area, the connection end of the optical fiber is displaced relative to the connection end of the connector by tensile force of the optical fiber.

8. The photoelectric transmission module according to claim 6, wherein the section of the flexible printed circuit board from the connection end of the connector to the connection end of the optical fiber extends in a direction crossing a longitudinal direction of the substrate that is defined along the longitudinal direction of the optical fiber, and wherein the optical fiber is connected to a side rim at a front end portion in the crossing direction.

9. The photoelectric transmission module according to claim 6, wherein the flexible printed circuit board further comprises a first region extending from the connection end of the connector in the longitudinal direction of the substrate defined along the longitudinal direction of the optical fiber, and a second region formed by bending and extending in a direction crossing the longitudinal direction of the substrate from an end of the first region opposite the connection end of the connector, and wherein the optical fiber is connected to a side rim of the second region at the front end portion in the crossing direction.

10. The photoelectric transmission module according to claim 6, wherein the flexible printed circuit board further comprises a first region extending from the connection end of the connector in the longitudinal direction of the substrate defined along the longitudinal direction of the optical fiber, a second region formed by bending and extending in a direction crossing the longitudinal direction of the substrate from an end of the first region opposite the connection end of the connector, and a third region formed by bending and extending in a longitudinal direction of the substrate from an end of the second region opposite the first region, and wherein the optical fiber is connected to a front end of the third region in the longitudinal direction of the substrate.

11. The photoelectric transmission module according to claim 6, wherein the outer surface of the flexible printed circuit board on a side of the substrate in a thickness direction of the flexible printed circuit board is fixed to the substrate at least within an area from the connection end of the connector to a position closer to the connection end of the optical fiber beyond a position of the photoelectric conversion element, and the displacement permitting area is formed in an optical signal transmission section for transmitting an optical signal from the position of the photoelectric conversion element to the connection end of the optical fiber.

12. A photoelectric transmission module for transmitting optical and electrical signals while being connected to a terminal of a composite cable comprising an optical fiber and an electrical cable, comprising: a substrate connected to the electrical cable drawn from the composite cable; a flexible printed circuit board comprising one end connected to a connector on the substrate and an other end connected to the optical fiber drawn from the composite cable; an optical waveguide member formed along an outer surface of the flexible printed circuit board and connected to the optical fiber to transmit an optical signal; a photoelectric conversion element on an outer surface of the flexible printed circuit board opposite the outer surface with the optical waveguide member formed thereon to bilaterally convert the optical signal transmitted from the optical fiber via the optical waveguide member and an electrical signal transmitted from the connector; an IC chip electrically connected to the photoelectric conversion element on the outer surface of flexible printed circuit board opposite the outer surface with the optical waveguide member formed thereon; a reinforcement plate on an outer surface of the flexible printed circuit board to absorb heat released from the photoelectric conversion element and the IC chip and to prevent deflection of the flexible printed circuit board from occurring therebetween; and a heat dissipating member having at least two contact surfaces, one contact surface being in contact with the reinforcement plate and an other contact surface being in contact with an external member to release the heat absorbed by the reinforcement plate to the external member as a contact object, wherein the flexible printed circuit board further comprises a displacement permitting area formed in a section from the connection end of the connector to the connection end of the optical fiber to allow the connection end of the connector and the connection end of the optical fiber to be relatively displaced in a direction along the substrate with deformation of the displacement permitting area, and wherein the heat dissipating member is movable, together with the displacement permitting area, in a direction along the substrate, and a length of the heat dissipating member from the one contact surface in contact with the reinforcement plate to the other contact surface in contact with the external member is set according to at least a movable distance of the reinforcement plate.

* * * * *